(12) United States Patent
Gitlevich et al.

(10) Patent No.: US 11,790,375 B2
(45) Date of Patent: Oct. 17, 2023

(54) FLEXIBLE CAPACITY IN AN ELECTRONIC ENVIRONMENT

(71) Applicant: ASAPP, New York, NY (US)

(72) Inventors: Igor Gitlevich, New York, NY (US); Max Sperlich, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 374 days.

(21) Appl. No.: 16/413,426

(22) Filed: May 15, 2019

(65) Prior Publication Data

US 2020/0364723 A1   Nov. 19, 2020

(51) Int. Cl.
  *G06Q 30/016* (2023.01)
  *G06Q 30/02*  (2023.01)
  *G06N 20/00*  (2019.01)

(52) U.S. Cl.
  CPC .......... *G06Q 30/016* (2013.01); *G06N 20/00* (2019.01); *G06Q 30/0281* (2013.01)

(58) Field of Classification Search
  CPC ... G06Q 30/016; G06Q 30/0281; G06N 20/00
  See application file for complete search history.

(56) References Cited

U.S. PATENT DOCUMENTS

| | | | | |
|---|---|---|---|---|
| 10,616,345 | B1* | 4/2020 | Ouimette | H04L 51/04 |
| 2006/0271418 | A1* | 11/2006 | Hackbarth, Jr. | H04M 3/523 |
| | | | | 379/265.01 |
| 2009/0285385 | A1* | 11/2009 | Dunbar | H04M 3/523 |
| | | | | 379/266.01 |
| 2014/0064086 | A1* | 3/2014 | Wiley | H04L 67/14 |
| | | | | 370/235 |
| 2014/0095627 | A1* | 4/2014 | Romagnino | H04L 51/043 |
| | | | | 709/206 |

(Continued)

OTHER PUBLICATIONS

Jodie Monger, "How many chat sessions can agents handle?", Sep. 13, 2016, https://customerthink.com/how-many-chat-sessions-can-agents-handle/ (Year: 2016).*

(Continued)

*Primary Examiner* — Sangeeta Bahl
*Assistant Examiner* — Joshua D Schneider
(74) *Attorney, Agent, or Firm* — HIPP LAW

(57) ABSTRACT

Machine learning-based approaches are used to automatically establish customer support sessions and/or assign customer support requests to customer support agents or other appropriate resources. For example, during a customer support session between a customer and a customer support agent, a trained model can process session data obtained during the session to determine prediction information (e.g., a next message prediction score, a predicted time for receiving a next message, a capacity score, etc.) The prediction information can be compared to an appropriate threshold to determine whether to establish a customer support session and/or assign a customer support request to the agent, even though the agent may otherwise be considered at capacity. In the situation it is determined to establish a session and/or assign a request to the agent, a session can be established and/or a request can be assigned to the agent based on scheduling or other information.

17 Claims, 16 Drawing Sheets

(56) References Cited

U.S. PATENT DOCUMENTS

| | | | | |
|---|---|---|---|---|
| 2016/0127553 | A1* | 5/2016 | McCormack | H04M 3/5232 |
| | | | | 379/265.03 |
| 2018/0084111 | A1* | 3/2018 | Pirat | H04L 51/04 |
| 2018/0091653 | A1* | 3/2018 | Miller | H04M 3/2281 |
| 2019/0158671 | A1* | 5/2019 | Feast | G06Q 10/10 |
| 2019/0220154 | A1* | 7/2019 | Muramoto | H04L 51/04 |
| 2021/0201246 | A1* | 7/2021 | Krucek | H04M 3/5238 |

OTHER PUBLICATIONS

Martin Hill-Wilson, "10 Things They Won't Tell You About Live Chat", Aug. 15, 2018, https://www.callcentrehelper.com/things-wont-tell-live-chat-130664.htm (Year: 2018).*

Corine Laan et al., "Static and dynamic appointment scheduling to improve patient access time", Nov. 28, 2017; Health 7(2):148-59, https://doi.org/10.1080/20476965.2017.1403675 (Year: 2017).*

* cited by examiner

FLEXIBLE CAPACITY IN AN ELECTRONIC ENVIRONMENT

BACKGROUND

As the number of services and products offered to customers increases, there is a corresponding increase in the need to efficiently interact with those customers. For example, customers may need to obtain information about services and/or products offered by a company, may have a question about billing, or may need technical support from the company. In any such situation, customers may interact with these companies in a variety of different ways. For example, customers may interact with a company via a company website, application, or phone number to submit customer support requests and obtain information via an interactive interface or customer support agent.

In conventional approaches to servicing customer support requests, a request may be assigned to a resource, such as a customer support agent, based on a max number of requests allotted to the customer support agent. For example, a customer support service provider may have a policy that a customer support agent is not to be assigned more than a predetermined number of customer support request. Although in some situations this may be a benefit to the agent, a potential disadvantage to such an approach, at least from a service provider's point of view, is that assigning requests to agents based on a max number of requests capable of being assigned to a particular agent can be misleading when the resolution to a request is already provided to the customer, and the customer fails to end a customer support session. Thus, while the customer support session is effectively resolved, the agent may still be considered fully occupied, and an available request may not be assigned to the agent, costing the company time and money. Accordingly, it is desirable to provide improved techniques for managing customer support requests.

BRIEF DESCRIPTION OF THE DRAWINGS

Various embodiments in accordance with the present disclosure will be described with reference to the drawings, in which.

DETAILED DESCRIPTION

Figure 1:
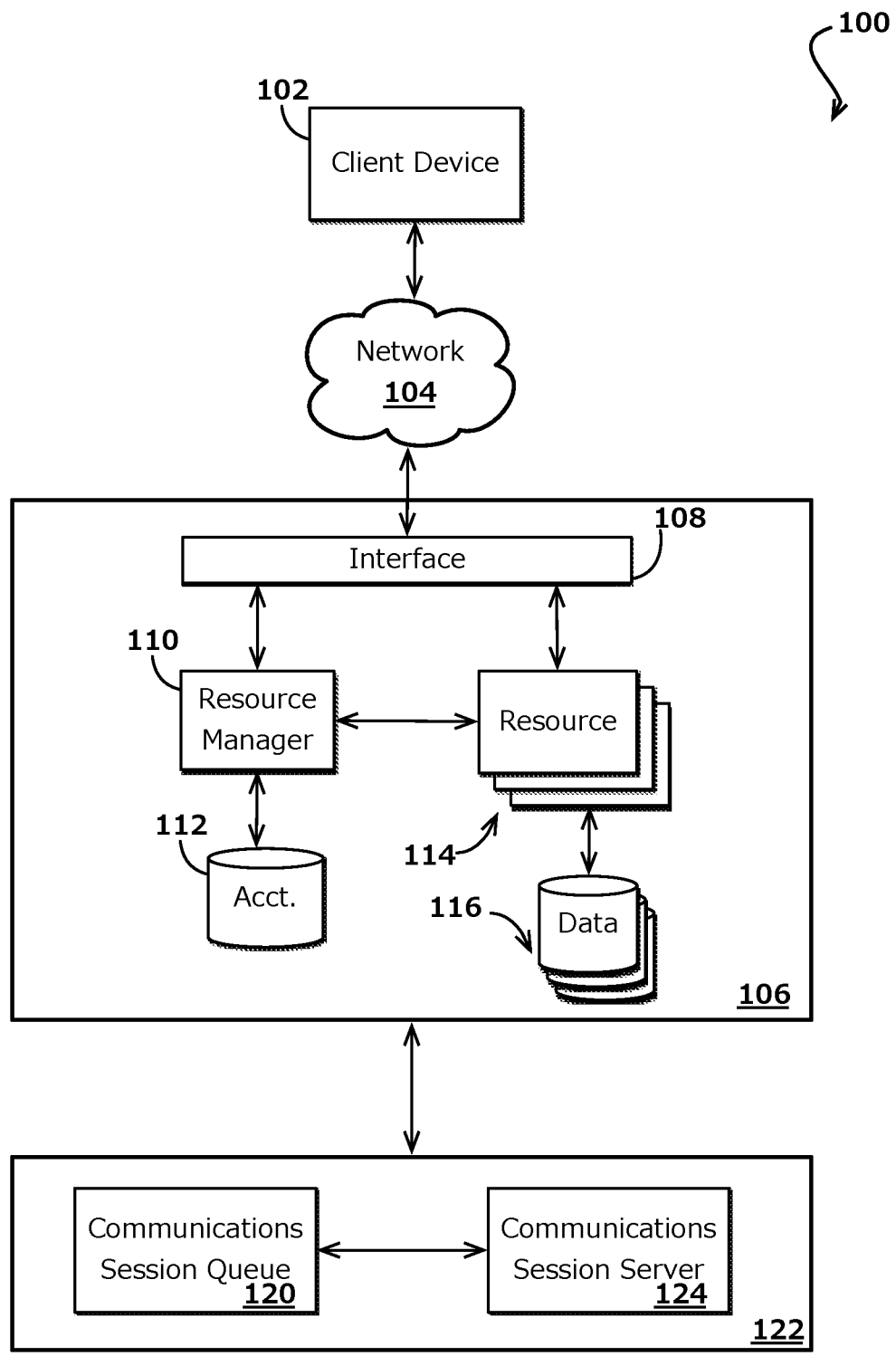
FIG. 1 illustrates an example environment in which aspects of the various embodiments can be implemented.

Systems and methods in accordance with various embodiments of the present disclosure may overcome one or more of the aforementioned and other deficiencies experienced in conventional approaches to managing tasks in an electronic environment. In particular, various embodiments describe machine learning-based approaches for automatically establishing customer support sessions and/or assigning customer support requests to customer support agents or other appropriate resources in an electronic environment.

For example, in accordance with an embodiment, during a customer support session or other communications session between a customer and a customer support agent, a trained prediction model (e.g., a machine learning-based model) can process customer support session data (e.g., times and text of messages exchanged between the customer and the customer support agent) or other communications session data associated with the customer support session to determine a next message prediction score or other such score. The next message prediction score in various embodiments quantifies a probability of receiving a message from at least one period of time. Once the next message prediction score is determined, the next message prediction score can be compared to a threshold prediction score. In the situation where the next message prediction score satisfies the threshold prediction score, an additional customer support session can be established and/or an additional customer support request can be assigned to the agent. In certain embodiments, establishing a customer support session and/or assigning a customer support request can be based on scheduling information. The scheduling information can specify, for example, when to establish an additional customer support session and/or when to assign an additional customer support request. In the situation where the next message prediction score does not satisfy the threshold prediction score, the prediction score can be continually determined, or determined in accordance with a determined interval based on the customer support session data, and compared with the threshold prediction score to determine whether to establish an additional customer support session and/or assign an additional customer support request to the agent.

In certain embodiments, the trained model can determine a capacity score for a customer support agent that can be used to decide whether to establish an additional customer support session and/or assign an additional customer support request to the agent. For example, the trained model can be utilized to analyze customer support sessions being processed by the customer support agent to determine an occupancy score for each customer support session. An occupancy score can quantify an amount of work being performed for a particular customer support session. The occupancy scores can be combined to determine a capacity score that quantifies a total amount of work currently being processed by the customer support agent. In certain embodiments, the trained model can determine the capacity score directly from analyzing the customer support sessions. In any situation, the capacity score can be compared to a capacity threshold. In the situation where the capacity score does not satisfy the capacity threshold (i.e., the customer support agent has the capacity for additional work), an additional customer support session may be established and/or an additional customer support request may be assigned to the customer support agent. In the situation where the capacity score does satisfy the capacity threshold (i.e., the customer support agent does not have the capacity for additional work), the capacity score can be continually updated and monitored, or at least updated and monitored based on a schedule. Thereafter, the updated capacity score can be used to determine whether to establish an additional customer support session and/or assign an additional customer support request to the agent.

Instructions for causing a computer system to automatically establish customer support sessions and/or assigning customer support requests to a customer support agent or other resource in accordance with the present disclosure may be embodied on a computer-readable medium. Further, in accordance with various embodiments, a system for establishing customer support sessions and/or assigning customer support requests based on the capacity of that customer support agent or other information is provided. For example, in accordance with an embodiment, a backend system may train a model to analyze a customer support session being processed by a customer support agent or other resource to determine whether to establish an additional customer support session and/or assign an additional customer support request to the agent. The backend system can include a monitoring service or component that can monitor customer support sessions being processed by the customer support agent. Thereafter, an additional customer support session can be established and/or assign an additional customer support request assigned when it is determined the customer support agent has the capacity to perform additional work.

It should be noted that embodiments described herein are not limited to using a next message prediction score or a capacity score to determine whether an additional customer support session can be established and/or an additional customer support request can be assigned to a customer support agent. In various embodiments, other information may be determined from the customer support or communications session data and used in the determination. For example, the trained model can determine one of a number of features from the customer support session data, and one or more of the features can be compared to at least one appropriate threshold to determine whether an additional customer support session can be established and/or an additional customer support request can be assigned to a customer support agent. The features can include, for example, predicted time information that specifies a time for receiving a next message, response time information that specifies an amount of time for responding to a customer message, activity information that specifies a level of activity associated with a customer support agent, among other such features. Once a feature is determined, the feature can be compared to an appropriate threshold to determine whether to establish an additional customer support session and/or assign an additional customer support request to a customer support agent. In an embodiment, a set of features may be determined, and individual scores of the features combined (e.g., an average score of the feature scores, a weighted average of the feature scores, a normalized average of the feature scores, etc.), and the combined score can be used in the determination.

As will be described further herein, a customer support agent can be associated with a task queue. The queue can include one or more occupancy slots, where an occupancy slot can be occupied by a customer support session, customer support request, or other task to be performed by the agent. For example, a slot is occupied when a customer support session is established with a customer support agent. In another example, a slot is occupied when a customer support request is assigned to a customer support agent. In accordance with various embodiments, establishing a customer support session can include, for example, enabling communications between a customer and a customer support agent. Assigning a customer support request can include, for example, establishing a customer session, associating a customer support request with a customer support agent or a profile (e.g., user profile, agent profile, etc.) associated with the customer support agent, or a combination thereof.

In certain embodiments, a queue may be associated with a resource including, for example, resources for processing, data storage, load balancing, parallel data processing, and various other services or systems that can process requests.

It should be noted that although the techniques described herein may be used for a wide variety of requests, for clarity of presentation, requests described herein are received from customers desiring customer support for a product, a service, or other offering from a company and/or appropriate entity. The techniques described herein, however, are not limited to customer support requests, and the requests may be from users who are not customers and establishing customer support sessions and/or assigning customer support requests may be performed by a third party on behalf of another company.

Embodiments provide a variety of advantages. For example, in accordance with various embodiments, machine learning-based approaches to automatically establish customer support sessions and/or assign customer support requests to a resource can be utilized by any system that attempts to optimize resource usage including computing system resources. These systems can include, for example, customer service platforms, airline booking platforms, accommodation booking platforms, financial platforms, medical platforms, electronic marketplaces, online bidding platforms, and other environments where customer service may be needed. In accordance with various embodiments, by providing a system that allocates work between resources, the system can more efficiently utilize resource capacity. For example, approaches described herein can improve the overall performance of responding to requests of customers seeking customer support from a company through the selection and assignment of requests to customer support agents or other electronic resources. The process is improved by using machine learning-based techniques to optimize resource utilization of various resources. In certain embodiments, one or more trained models can be updated over at least one period of time using computer-readable information based on one or more performance metrics to ensure optimal usage of various resources. Further, approaches described herein advantageously provide for improved load balancing of requests to ensure a small backlog of requests. This can reduce idle resources, or other such inefficiencies of the resources, which can maximize resource usage and reduce cost.

Various other functions and advantages are described and suggested below as may be provided in accordance with the various embodiments.

FIG. 1 illustrates an example environment 100 in which aspects of the various embodiments can be implemented. It should be understood that reference numbers are carried over between figures for similar components for purposes of simplicity of explanation, but such usage should not be construed as a limitation on the various embodiments unless otherwise stated. In this example, a user can utilize a client device 102 to communicate across at least one network 104 with a resource provider environment 106. The client device 102 can include any appropriate electronic device operable to send and receive requests, messages, or other such information over an appropriate network and convey information back to a user of the device. Examples of such client devices 102 include personal computers, tablet computers, smartphones, notebook computers, and the like.

The resource provider environment 106 can provide customer support services for companies for various services. These services can include, for example, payment services, technical support services, human resource services, among other such services, products, and/or offerings. In certain embodiments, a resource provider of environment 106 can be an intermediary between a customer of a company and the company. The provider can, for example, assist a company by providing customer support for the company. This can include, for example, automatically responding to customer support requests, connecting a customer with a customer service representative (CSR), customer support agent, etc., selecting a CSR to process a customer support request, establishing customer support sessions between customers and CSRs, providing resources to CSRs to process customer support requests, etc. In various embodiments, the functions of a CSR can be performed in hardware and software, such as by using a trained model, a person, or combination thereof.

The network(s) 104 can include any appropriate network, including an intranet, the Internet, a cellular network, a local area network (LAN), or any other such network or combination, and communication over the network can be enabled via wired and/or wireless connections.

The resource provider environment 106 can include any appropriate components for receiving requests and returning information or performing actions in response to those requests. It should be noted that although the techniques described herein may be used for a wide variety of users and requests, for clarity of presentation, examples of companies providing a response to a request of a customer will be used. The techniques described herein, however, are not limited to customers and companies, and responses may be provided to requests from users who are not customers, and responses may be from any entity or person.

The resource provider environment 106 might include Web servers and/or application servers for receiving and processing requests then establishing customer support sessions and/or assigning customer support requests. While this example is discussed with respect to the internet, web services, and internet-based technology, it should be understood that aspects of the various embodiments can be used with any appropriate services available or offered over a network in an electronic environment.

In various embodiments, resource provider environment 106 may include various types of resources that can be used to automatically establish customer support sessions and/or assign customer support requests to customer support agents or other resources. The resources can include, for example, communications session queue 120 operable to maintain a queue of customer service requests, communications session server 124 operable to facilitate establishing customer support sessions and/or assigning customer support requests, application servers operable to process instructions provided by a user or database servers operable to process data stored in one or more data stores 116 in response to a user request. The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or components.

In at least some embodiments, an application executing on the client device 102 that needs to access resources of the provider environment 106, for example, to communications session queue 120 or communications session server 124, can submit a request that is received to interface layer 108 of the provider environment 106. The interface layer 108 can include application programming interfaces (APIs) or other exposed interfaces enabling a user to submit requests, such as Web service requests, to the provider environment 106. Interface layer 108 in this example can also include other components as well, such as at least one Web server, routing components, load balancers, and the like.

When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as communicating the request to a management component or other control component which can be used to manage one or more instances of communications session queue 120 or communications session server 124 as well as other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106.

A host machine 122 in at least one embodiment can host a customer service management service (not shown) that can offer at least one type of server, such as communications session server 124, that can assign jobs or tasks such as customer support requests that can be queued or properly balanced using communications session queue 120. In at least some embodiments, the customer service management service can determine when a customer support request is effectively resolved, and assign a customer support request to a resource (e.g., a customer support agent) or establish a customer support session with the customer support agent to ensure a small backlog of customer support requests that can be performed asynchronously to maximize resource usage and reduce cost.

As will be described further herein, a customer support request can be considered effectively resolved under a number of circumstances, including, for example, when an anticipated amount of effort by a customer support agent to complete a customer support request satisfies a threshold amount of effort, a period of time for receiving the next customer message satisfies a threshold amount of time, etc.

It should be noted that although host machine 122 is shown outside the provider environment, in accordance with various embodiments, communications session queue 120 and communications session server 124 can both be included in provider environment 106, while in other embodiments, one or the other can be included in the provider environment. It should be further noted that host machine 122 can include or at least be in communication with other components, for example, a training component, a session manager, etc.

In conventional approaches, a customer support request may be assigned to a resource, such as a customer support agent, based on a current number of customer support requests assigned to the customer support agent. For example, a customer support agent may be associated with a queue and the queue may include any number of slots, where each slot can be associated with a customer support request. In this example, the capacity of a customer support agent is based on the number of occupied slots. For example, if a customer support agent is associated with a queue having four slots, and each slot is associated with a customer support request, the customer support agent is considered to be at full capacity, or at least at a threshold capacity, and a new customer support request may not be assigned to the queue associated with the customer support agent. Likewise, a new customer support session may not be established with the customer support agent. An empty slot, such as a slot not associated with a customer support request, may represent available capacity of the customer support agent, and an additional customer support request may be assigned to the queue associated with the resource and/or an additional customer support session may be established between a customer of the customer support request and the customer support agent.

A potential disadvantage to such an approach, however, at least from a service provider's point of view, is that assigning customer support requests and/or establishing customer support sessions with customer support agents based on a max number of customer support requests capable of being assigned to a particular customer support agent can be misleading. For example, in the situation where a resolution to a customer support request has been provided to the customer, the customer may fail to end the customer support session, or at least may not provide a response within an expected response period. This may occur, for example, when the customer does not close out of a customer support session or other communications session or indicate that the issue is resolved and/or that no other issues remain. Thus, although the customer support session is effectively resolved, the customer support agent may still be considered at full capacity, and a pending customer support request may not be assigned to the customer support agent.

Accordingly, in accordance with various embodiments, in the situation where it is determined that a customer support request is resolved (i.e., effectively resolved or otherwise) or a customer support agent can be assigned an additional customer support request while satisfying a service level policy, a customer support session can be established between a customer (and/or authorized person) and a customer support agent and an additional customer support request can be assigned to the customer support agent or a task queue associated with the customer support agent.

Figure 2A:
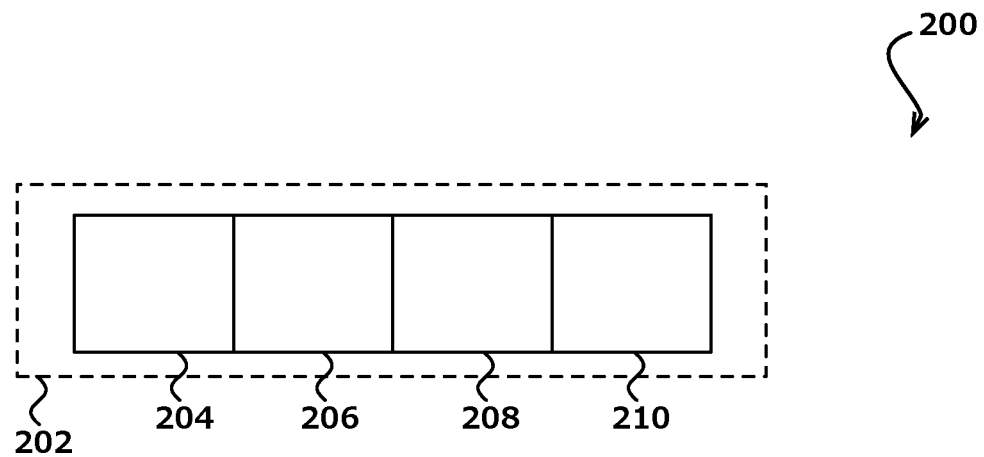
FIGS. 2A, 2B, 2C, and 2D illustrate example approaches to managing customer support requests in accordance with various embodiments.

FIGS. 2A, 2B, 2C, and 2D illustrate example approaches to managing customer support requests in accordance with various embodiments. FIG. 2A illustrates example 200 of a customer support agent with the capacity to process customer support requests in accordance with various embodiments. A queue in accordance with various embodiments can be associated with a resource, such as a customer support agent, and can include any number of slots. In this example, queue 202 includes slots 204, 206, 208, and 210.

Each slot can be assigned a customer support request, and for each slot associated with a customer support request, a customer support session or other communications session can be established between a customer of the customer support request and a customer support agent. For example, when a customer contacts a company for customer support, the customer may provide a description of an issue for which the customer wants to receive customer support, called a customer support request or request. In an example, a customer may inquire why Internet service is not working.

Once the customer support request is received, the customer support request can be assigned to a slot of a queue of a customer support agent, and a customer support session to resolve the request can be established between the customer who submitted the request and a customer support agent associated with the queue. As shown in example 200 of FIG. 2A, customer support requests have not been assigned to slots 204, 206, 208, and 210 of queue 202. As such, the customer support agent associated with queue 202, or other resource associated with queue 202, has the capacity to process customer support requests, and a customer support request can be assigned to the customer support agent.

It should be noted that embodiments described herein are not limited to assigning customer support requests to a queue associated with a customer support agent. In various embodiments, a customer support agent can be associated with a customer support profile or account, or an identifier, or other information that can be used to identify the customer support agent, and customer requests can be assigned to the customer support agent by assigning a customer support request to the queue, profile, identifier, etc. associated with the customer support agent.

Figure 2B:
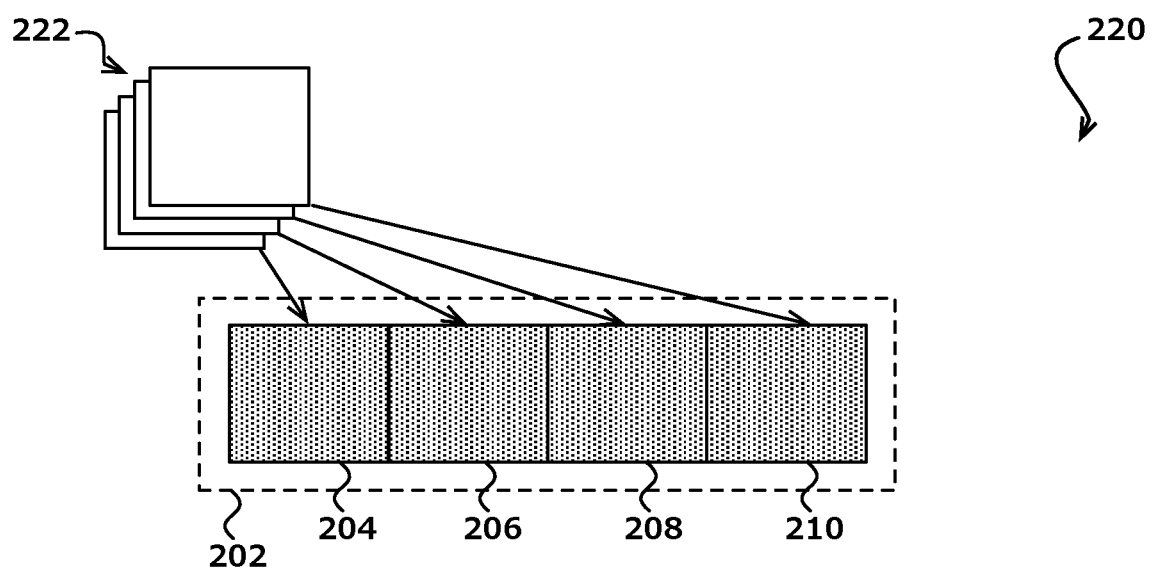

FIG. 2B illustrates example 220 of a customer support agent at full capacity in accordance with various embodiments. In this example, individual slots 204, 206, 208, and 210 are assigned to customer support requests from the set of customer support requests 222. In accordance with various embodiments, the customer support requests can be assigned to an appropriate customer support agent using one or more of a number of assignment techniques. The techniques can be based on rules, policies, models, etc. For example, an assignment rule may specify that a customer support request is to be assigned to the first available customer support agent. An assignment policy may specify that each customer support agent should have at least one customer support request assigned. A model may be used to determine information about the customer support request and use that information to assign the customer support request to an appropriate customer support agent.

As shown in example 220 of FIG. 2B, customer support requests have been assigned to slots 204, 206, 208, and 210. As such, the customer support agent associated with queue 202 is at capacity, and under conventional approaches, a customer support request would likely not be assigned to the customer support agent. However, in accordance with various embodiments, in the situation where it is determined that a customer support request is resolved (e.g., effectively resolved or otherwise) or a customer support agent can be assigned an additional customer service request while satisfying a service level policy, a customer support session can be established between a customer (and/or authorized person) and a customer support agent and an additional customer support request can be assigned to the customer support agent or a task queue associated with the customer support agent.

Figure 2C:
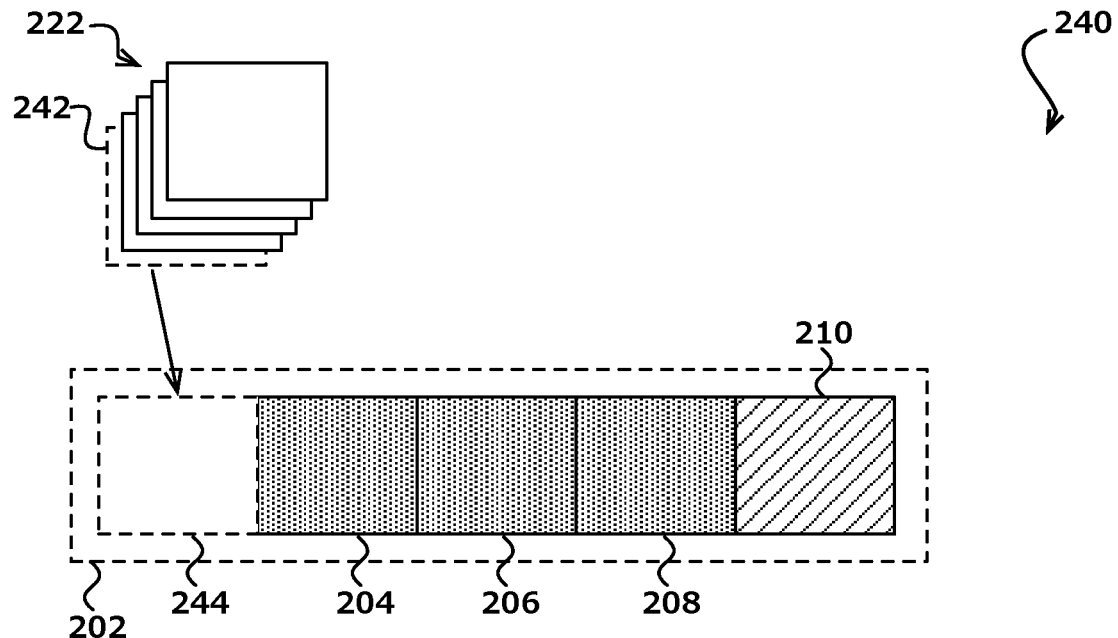

For example, FIG. 2C illustrates example 240 of a customer support agent with slack capacity in accordance with an embodiment. In this example, it is determined a customer support request associated with slot 210 is effectively resolved. A customer support request can be considered effectively resolved under a number of circumstances, including, for example, when an anticipated amount of effort by a customer support agent to complete a customer support request satisfies a threshold amount of effort, a period of time for receiving the next customer message satisfies a threshold amount of time, etc. As will be described further herein, a trained prediction model or other such model can be used to process customer support session data (e.g., times and text of messages exchanged between the customer and the customer support agent) or other communications session data to determine whether a customer service request is effectively resolved and/or whether a customer support agent has the capacity. Once it is determined that the customer support request associated with occupancy slot 210 is effectively resolved, the customer support agent associated with queue 202 can be associated with slack capacity 244. In an embodiment, slack capacity can be considered, for example, available capacity of a customer support agent or other resource. Thereafter, a customer support session can be established with the customer support agent, and an additional customer support request 242 can be associated with queue 202.

Figure 2D:
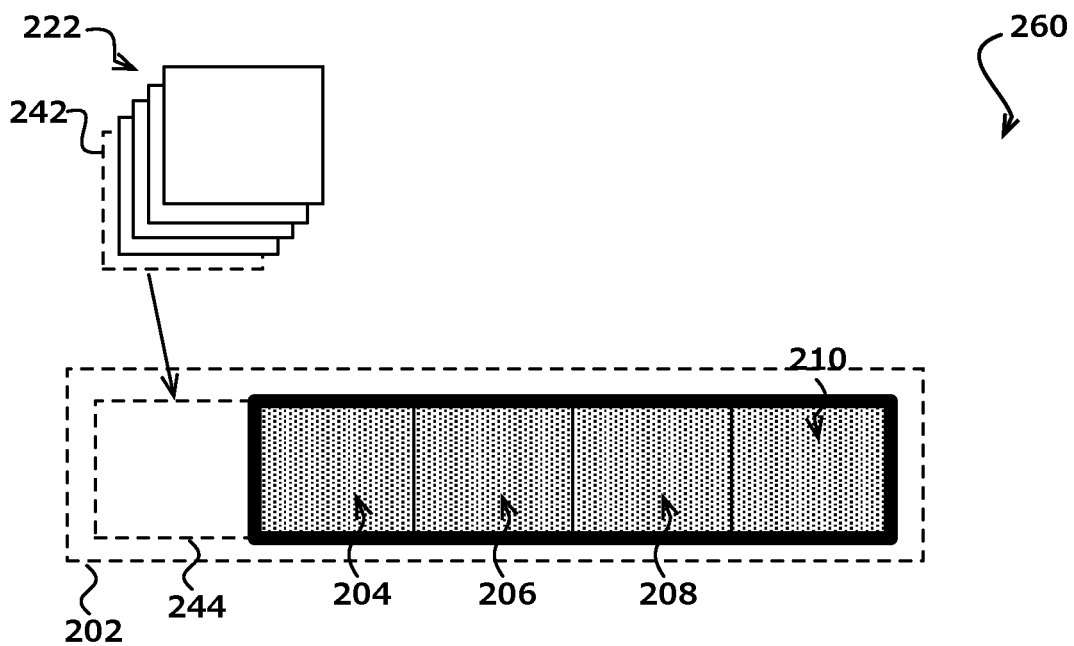

FIG. 2D illustrates example 260 of a customer support agent with slack capacity in accordance with an alternate embodiment. In this example, it is determined that a customer support agent has "slack" or additional capacity to establish an additional customer support session and/or assign an additional customer support request to the customer support agent.

In an embodiment, an agent's capacity can be based on a capacity score associated with the agent, where the capacity score can be determined in one of a number of ways. For example, a list of customer support sessions such as a list of communications sessions being processed by the customer support agent can be obtained. The list of customer support sessions can be processed to determine a total number of messages between the agent and customers over a period of time. In an embodiment, the capacity score can be the ratio of the total number of messages and the period of time.

In another example, a trained model can determine an occupancy score for each customer support session in the list of customer support sessions. An occupancy score can quantify an amount of work being performed for a particular customer support session. In one example, an occupancy score can quantify one or more of a number of customer messages, a number of customer support agent messages, an amount of customer support agent activity, etc. over a period of time. The occupancy scores can be combined to determine a capacity score that quantifies a total amount of work currently being processed by the customer support agent. The capacity score in certain embodiments may quantify an amount of available capacity of a customer support agent. In certain embodiments, the trained model can determine the capacity score directly from analyzing the customer support sessions. In any situation, the capacity score can be compared to a capacity threshold. In the situation where the capacity score does not satisfy the capacity threshold (i.e., the customer support agent has the capacity for additional work), an additional customer support session may be established and/or an additional customer support request may be assigned to the customer support agent. In the situation where the capacity score does satisfy the capacity threshold (i.e., the customer support agent does not have the capacity for additional work), the capacity score can be continually updated and monitored, or at least updated and monitored based on a schedule. In this example, the capacity score does not satisfy the capacity threshold, and the customer support agent associated with queue 202 can be associated with slack capacity 244. Thereafter, a new customer support session can be established with the customer support agent, and an additional customer support request 242 can be associated with queue 202. It should be noted that the capacity threshold, as with other thresholds described herein, can be predetermined or dynamically adjusted either manually by an administrator or other authorized person or automatically based on, for example, system state signals (e.g., current queue time, number of agents available, etc.) In an example, the capacity threshold can be adjusted accordingly based on the number of agents. In another example, in the situation where a capacity score quantifies a total amount of work currently being processed by the customer support agent, and a threshold number of agents are available, then the capacity threshold can be lower than a reference or default capacity score. This can optimize an amount of work processed by the system and perhaps further ensure that customers do not experience an excess wait time.

Figure 3A:
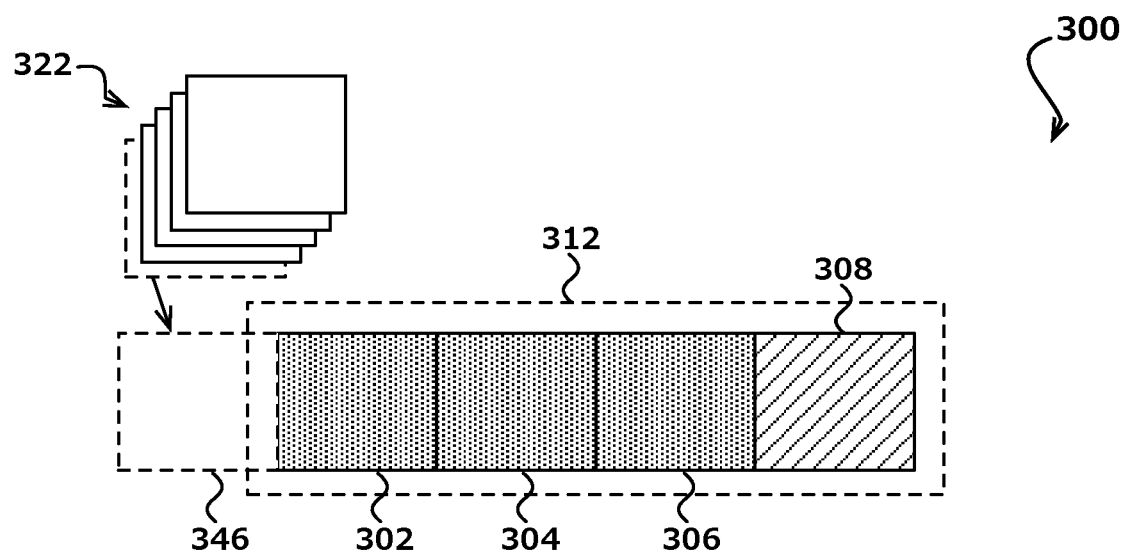
FIGS. 3A, 3B, and 3C illustrate an example approach to assigning tasks in accordance with various embodiments.
Figure 3B:
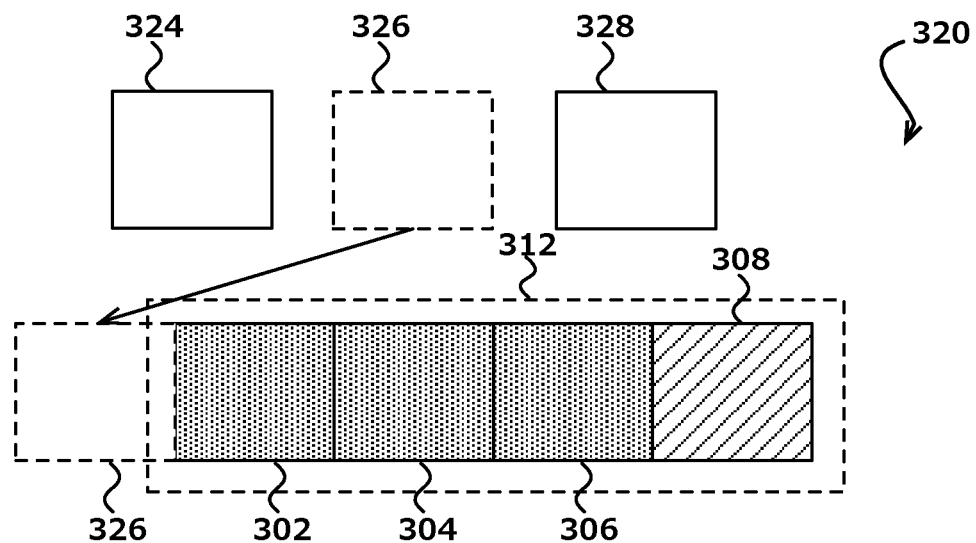

In accordance with various embodiments, once a customer support request is determined to be resolved and/or a customer support agent has the capacity, various approaches can be utilized to determine which available customer support session to establish customer support request is assigned to the customer support agent or other appropriate resource. FIGS. 3A and 3B illustrate example approaches to assigning customer support requests in accordance with various embodiments.

FIG. 3A illustrates an example 300 where the next available customer support request is assigned to a customer support agent or other appropriate resource in accordance with various embodiments. In this example, when customer support requests are received, they can be queued, for example, in a global queue. A global queue is operable to, for example, maintain a plurality of customer support requests and/or available customer support sessions. When it is determined that a customer support agent includes slack capacity, a customer support request from the global queue, or from some other component, can be assigned to the customer support agent and/or a customer support session established. It should be noted, however, that in certain embodiments the customer service requests are not queued, and instead are assigned to customer support agents.

Example 300 of FIG. 3A illustrates that slots 302, 304, 306, and 308 of queue 312 are associated with customer support requests from the set of customer support requests 322. In this example, the customer support request associated with slot 308 is effectively resolved, and queue 312 includes slack capacity 346. As such, the next available customer support request can be assigned to queue 312, and a new customer support session can be established with the customer support agent associated with queue 312.

FIG. 3B illustrates an example 320 of determining which customer support request to assign to a customer support agent in accordance with various embodiments. In this example, information associated with customer support requests, customer support agents, or customers can be analyzed to determine which customer support request to assign to a customer support agent. For instance, the familiarity of a customer support agent with a particular type of customer support request can be considered when deciding which customer support agent to assign the customer support request to. It should be noted that familiarity is one example of a number of factors that can be considered when determining the selection.

In accordance with an embodiment, customer support requests 324, 326, and 328 can represent, for example, potential requests to be assigned to queue 312. The customer support requests can be associated with a source, such as a customer, and queue 312 can be associated with a resource, such as a customer support agent. Customer support requests, customer support agents, and/or customers can be associated with information that can be used to describe features of the customer support requests, the customers, and the customer support agents. The information can be used to describe, for example, a type of customer support request, past customer support requests by a customer, past customer support requests resolved by a customer support agent, etc. In accordance with an embodiment, the information associated with the customer support request can be determined from text or audio associated with the customer support request, the information associated with the customer can be obtained from a customer profile, user profile, or from the customer support request, and the information associated with the customer support agent can be obtained from a customer support agent profile or other appropriate data store. It should be noted that the information used to represent the customer support request, customer, and customer support agent can be maintained in one or more data sets across one or more data stores.

Customer support requests 324, 326, and 328 can be ranked, and the associated rankings can be used to assign one of the requests to a customer support agent associated with queue 312. For example, at least one ranking technique can process the features or a feature vector to determine a set of matching scores or other such scores associated with customer support requests 324, 326, and 328. A matching score can, for example, quantify the degree to which a customer support request matches a particular customer support agent.

Once the matching scores are determined, a customer support request can be selected and assigned to a queue of a customer support agent based on the feature scores. In an example, this can include selecting the highest scoring customer support request. In another example, a model (e.g., linear model, neural network, etc.) can be utilized to select a customer support request. As shown in example 320 of FIG. 3B, based on the matching scores associated with customer support requests 324, 326, and 328, customer support request 326 is selected and assigned to queue 312, and a new customer support session can be established with the customer support agent associated with queue 312.

Figure 3C:
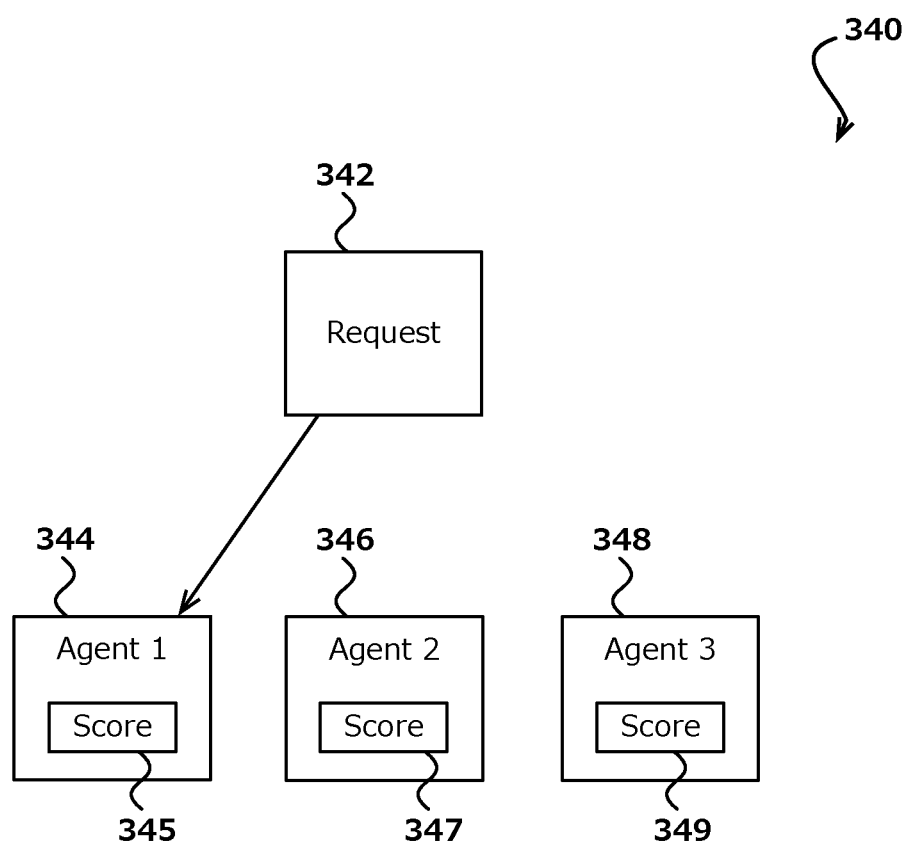

FIG. 3C illustrates an example 340 of determining which customer support agent to assign a customer support request in accordance with various embodiments. In this example, a customer support request is assigned to a customer support agent based on a capacity score associated with the customer support agent. For example, customer support request 342 can represent an unassigned customer support request. Customer support agents 344, 346, and 348 can be associated with individual capacity scores 345, 347, and 349. In accordance with various embodiments, a capacity score can quantify a total amount of work currently being processed by a customer support agent.

In an embodiment, the capacity score for each customer support agent be compared to a capacity threshold. In the situation where the capacity score does not satisfy the capacity threshold (i.e., the customer support agent has the capacity for additional work), a customer support request may be assigned to the customer support agent. In this example, the capacity scores associated with customer support agents 344 and 348 do not satisfy the capacity threshold. As such, customer support request 342 can be assigned to one of customer support agent 344 or customer support agent 348. In the situation where the capacity score does satisfy the capacity threshold (i.e., the customer support agent does not have the capacity for additional work), the capacity score can be continually updated and monitored, or at least updated and monitored based on a schedule. In certain embodiments, filtering or otherwise determining a subset of customer support agents is optional, and the determination to assign customer support request 342 to one of the customer support agents can be made without determining a subset of customer support agents.

Once the eligible customer support agents are determined, or another appropriate determination is made, customer support request 342 is assigned to one of the customer support agents. For example, assuming the eligible list of customer support agents includes agents 344 and 348, agents 344 and 348 can be ranked based on their respective capacity score, and the associated rankings can be used to assign customer support request 342 to customer support agent 344 or 348. In an embodiment, customer support request 342 can be assigned to a customer support agent associated with the lowest capacity score (i.e., a customer support agent having the most capacity/bandwidth for handling a customer support request). In example 340 of FIG. 3C, capacity score 345 associated with customer support agent 344 is less than capacity score 349 associated with customer support agent 348. As such, customer support request 342 is assigned to customer support agent 344. It should be noted that embodiments described herein are not limited to selecting the customer support agent associated with the lowest capacity score. In various embodiments, other selection criteria can be contemplated by those skilled in the art.

Figure 4:
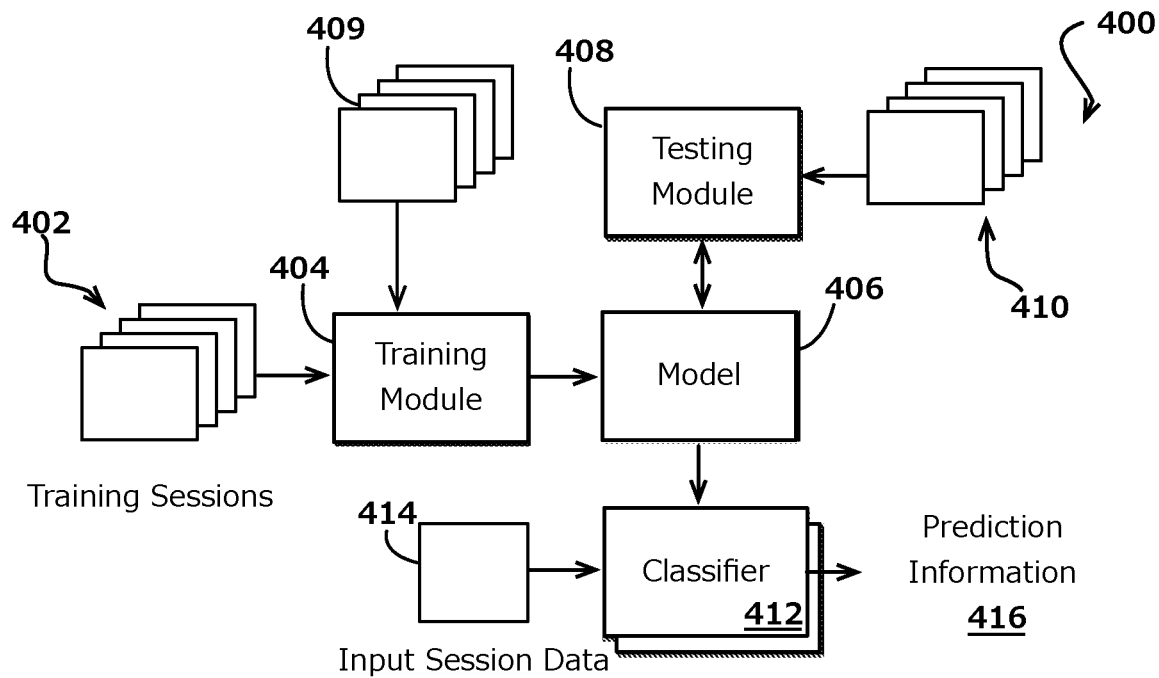
FIG. 4 illustrates an example classification pipeline that can be utilized in accordance with various embodiments.

FIG. 4 illustrates an example classification pipeline 400 that can be utilized in accordance with various embodiments. In this example, data is obtained that can be used to train one or more models 406 to determine information that can be used to determine whether to establish an additional customer support session and/or assign an additional customer support request to the agent assign customer support requests to customer support agents or other appropriate resources. Training data 402 and 409 can include customer support session data (e.g., times and text of messages exchanged between the customer and the customer support agent, etc.) or other communications session data between customers and customer support agents during customer support sessions. For example, a company may retain records of previous interactions with a customer, such as call transcripts, text conversation transcripts, timestamp records, etc. The company may also retain a record of the activity on a customer account or other account profile or user profile. The records may provide a description of an issue for which a customer wants to receive customer service, called a customer support request. The customer support request or communications session can be associated with a category or customer intent, such as billing or tech support, for example. The records may also include information specifying timestamp records, an amount of time to resolve a customer support request, average customer response time between messages during a customer support session, the total number of customer and customer support agent messages during a customer support session or other period of time, the average number of messages over a period of time (e.g., one minute) during a customer support session, the average customer support session duration, the average time elapsed since a previous messages for particular message types, the average number of sentences in a customer support session, the average completion time for different stages of a customer support session for different categories of customer support sessions, etc.

In order to function as training data for one or more models (e.g., a machine learning-based model), at least some of the customer support session data can include (or be associated with) data that indicates a label, type, or classification of the customer support data. The classifications in at least some embodiments can be selected from a set of classifications, or sub-classifications used to identify various types of messages, customer support requests, timing information, etc.

The training data can be labeled using one of any number of approaches. For example, a human can annotate the data. In another example, the training data can be labeled using a feature extractor to extract features of the training data, and a category model to perform the classification of the training data based on the extracted features. A feature extractor can extract, for example, word n-grams, a matrix of word embeddings, etc. from the data. A category model can include, for example, a support vector machine, logistic regression classifier, a convolution or recurrent neural network, etc. The category model may be trained, for example, on data from the company database that has been annotated by human experts. The output of the category model can be, for example, a one-of-k vector (where one element of the vector is true, or 1 and the remaining values are false or 0) indicating which category the data belongs to (of k possible categories).

In some embodiments, the customer support session data can be analyzed to determine which data is sufficient to be considered as part of a training set to be used to train models. In some embodiments, a portion of the training set will be retained as testing set 410 to use to test the accuracy of the trained model. In this example, the training data is accessible to a training module 404 which can feed the data to model 406 (e.g., a machine learning-based model) to train the network.

The classification data can be provided to the model so the model can learn features associated with the customer support session data. The network can then learn various combinations or relations of features of the customer support session data, such that when information for a customer support session or other communications session is processed with the trained model, the model can recognize the features and output the appropriate classification for the customer support request, as well prediction information, although other information can be utilized to establish an additional customer support session and/or assign an additional customer support request within the scope of the various embodiments.

Once at least the initial training has completed, a testing module 408 can utilize the testing data 410 to test the trained model. Since the testing data already includes classification data, such as data operable to label, identify, or otherwise indicate ground truth, the classifications and predictions generated by the model can be compared against that data to determine the accuracy of the model, both overall and for different categories of customer support requests. The testing data can also be used to train the model further. The results can be analyzed and if the results are acceptable, such as where the accuracy at least meets a minimum accuracy threshold for some or all of the classifications and predictions, the model can be provided to a classifier 412 that is able to process customer support session data 414, and generate prediction information 416, including, for example, a next message prediction score, a capacity score, or other such score or information that can be used to establish an additional customer support session and/or assign an additional customer support request.

In some embodiments, the training data 402 can be used as training data for a XGBoost model, convolutional recurrent neural network, deep neural network, or other types of neural networks or models, and/or combination of any of the above models, stacked models and heuristic rules. In other embodiments, generative adversarial networks (GANs) can be used that do not require the data seeding used for training deep neural networks. Various other approaches can be used as well as discussed and suggested elsewhere herein. Deep neural networks, or deep learning, can involve representing as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional recurrent neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity or can be learned algorithmically based on user queries, among other such options.

Figure 5:
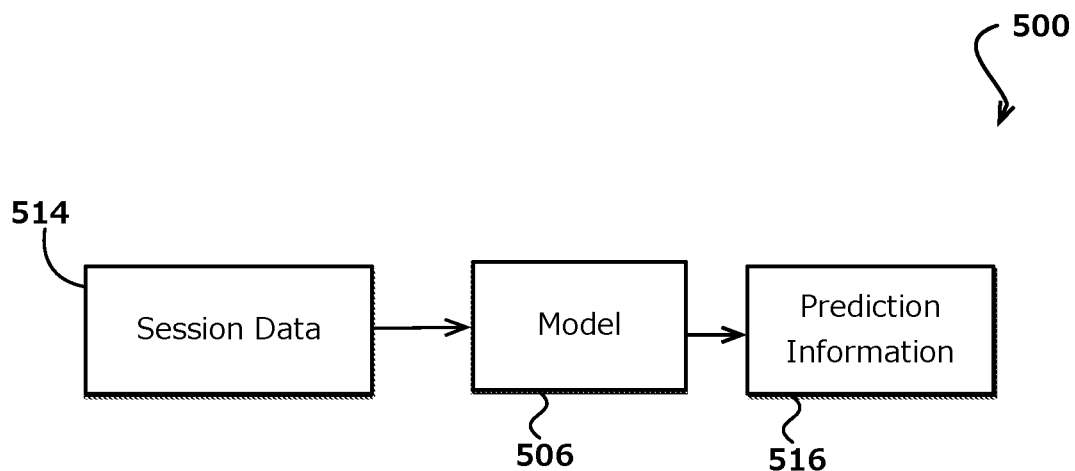
FIG. 5 illustrates an example approach to utilizing a trained model in accordance with various embodiments.

Once the model is trained, the model can be used to, for example, establish customer support sessions between customers and customer support agents and/or assign customer support requests to customer support agents or other appropriate resources, as illustrated in example 500 of FIG. 5. In this example, during a customer support session between a customer and a customer support agent, model 506 can process session data 514 (e.g., customer support session data or communications session data, or related data) to determine prediction information 516. As described, session data 514 can include, for example, a description of an issue for which a customer wants to receive customer service, called a customer support request, a category for the customer support request (e.g., billing, tech support, etc.), average customer response time between messages during the customer support session, the total number of customer and customer support agent messages during the customer support session, the average number of messages over a period of time (e.g., one minute) during the customer support session, the amount of time elapsed since a previous messages, customer support agent activity (e.g., keystrokes, resource usage, etc.), resource activity (e.g., router activity, database activity, etc.)

Prediction information 516 can include, for example, a next message prediction score, a predicted time for receiving a next message, a capacity score, or other such information. The next message prediction score can quantify a probability of receiving a message from a customer within a period of time. In certain embodiments, the next message prediction score can include a set of probabilities, where each probability can correspond to a specific time (e.g., two minutes) or a range of time (e.g., 2-3 minutes). For example, the set of probabilities can specify that in one minute there is a twenty-five percent chance of receiving a message from the customer, in two minutes there is a forty percent chance of receiving a message from the customer, in three minutes there is a sixty percent chance of receiving a message from the customer, and so on.

The predicted time can specify a particular amount of time (e.g., two minutes) or range of times (between two and four minutes) for receiving a next message. The time can be an amount of time (e.g., two minutes) or a time of day that includes, for example, the hour, minute, and seconds of the time of day. The predicted time in certain embodiments can be associated with a probability that quantifies a likelihood of receiving a message from a customer at the predicted time.

The capacity score can, for example, quantify a total amount of work currently being processed by a customer support agent.

In the situation where prediction information 516 includes a next message prediction score, the next message prediction score can be compared to a threshold prediction score to determine whether to establish a customer support session and assign a customer support request to the agent, even though the agent may otherwise be considered at capacity. In the situation where the next message prediction score satisfies the threshold prediction score, a customer support session can be established with the agent, and a customer support request can be associated with the agent. In the situation where the next message prediction score does not satisfy the threshold prediction score, the prediction score can be continually determined, or determined in accordance with a determined interval, and compared with the threshold prediction score to determine whether to establish a customer support session with the agent, and/or assign a customer support request to the agent.

In the situation where prediction information 516 includes a predicted time for receiving a next message, the predicted time can be compared to a threshold time to determine whether to establish a customer support session and assign a customer support request to the agent. In the situation where the predicted time satisfies the threshold time, a customer support session can be established with the agent, and a customer support request can be associated with the agent. In the situation where the predicted time does not satisfy the threshold time, the predicted time can be continually determined, or determined in accordance with a determined interval, and compared with the threshold time to determine whether to establish a customer support session with the agent and assign a customer support request to the agent.

In certain embodiments, prediction information 516 can include a capacity score for a customer support agent that can be used to decide whether to establish a customer support session and assign a customer support request to the agent. In this example, model 506 can be utilized to analyze session data 514 to determine an occupancy score for each customer support session for a customer support agent. An occupancy score can quantify an amount of work being performed for a particular customer support session. The occupancy scores can be combined to determine a capacity score that quantifies a total amount of work currently being processed by the customer support agent. In certain embodiments, model 506 can determine the capacity score directly from analyzing the customer support sessions. In certain embodiments, a list of customer support sessions or other communications sessions being processed by the customer support agent can be obtained. The list of customer support sessions can be processed to determine a total number of messages between the agent and customers over a period of time. In an embodiment, the capacity score can be the ratio of the total number of messages and the period of time.

In any situation, the capacity score can be compared to a capacity threshold. In the situation where the capacity score does not satisfy the capacity threshold (i.e., the customer support agent has the capacity for additional work), a customer support session may be established with the agent, and a customer support request can be associated with the agent. In the situation where the capacity score does satisfy the capacity threshold (i.e., the customer support agent does not have the capacity for additional work), the capacity score can be continually updated and monitored, or at least updated and monitored based on a schedule. Thereafter, the updated capacity score can be used to determine whether to establish a customer support session and/or assign a customer support request to the agent.

In accordance with various embodiments, thresholds described herein (e.g., a capacity threshold, a threshold time, a threshold prediction score, etc.) can be predetermined or dynamically adjusted either manually by an administrator or other authorized person or automatically based on, for example, system state signals (e.g., current queue time, number of agents available, etc.) This can optimize an amount of work processed by the system and perhaps further ensure that customers do not experience an excess wait time.

Figure 6:
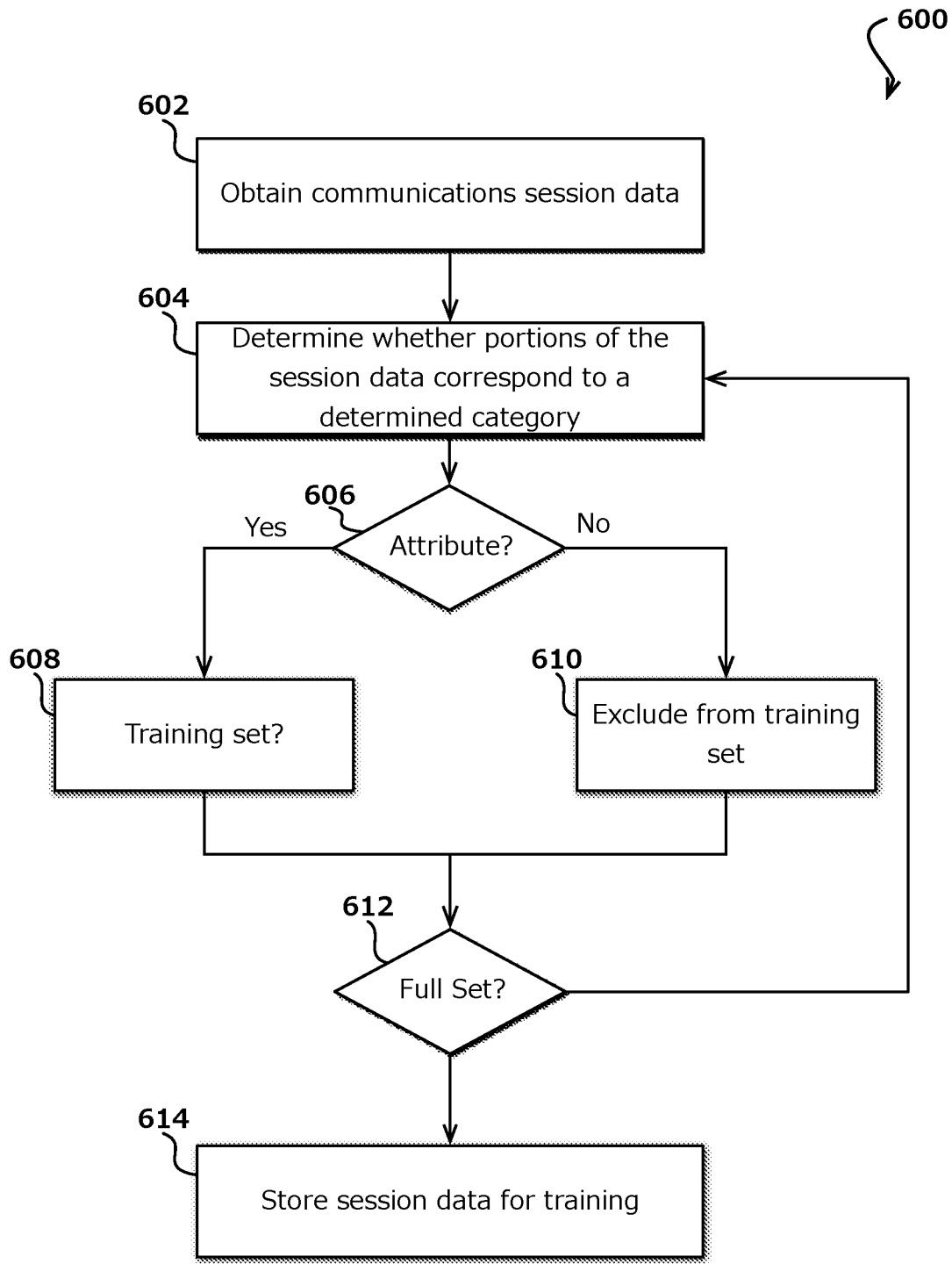
FIG. 6 illustrates an example process for determining training data that can be utilized in accordance with various embodiments.

FIG. 6 illustrates an example process 600 for determining training data that can be utilized in accordance with various embodiments. It should be understood that, for any process discussed herein, there can be additional, fewer, or alternative steps, performed in similar or different orders, or in parallel, within the scope of the various embodiments unless otherwise stated.

In this example, customer support session data such as communications session data can be obtained 602 for analysis. The session data can be obtained from, for example, company records, customer support logs, customer profiles, customer agent profiles, or otherwise obtained. In certain embodiments, the training data can be from one or more data stores maintained directly or indirectly by a customer support service provider, resource provider, or a third party, or from multiple sources, among other such options. The session data can include, for example, times of messages exchanged between customers and customer support agents, text of the messages, statistical relationships (e.g., average time, minimum time, maximum time, etc.) related to the times of the messages, company records of previous interactions between customers and customer support agents, etc.

For at least some of the customer support session data, such as a randomly selected subset or another such determination, such as the manner in which the session data was obtained (e.g., third-party, generated, downloaded, etc.), data or other information associated with the session data can be used to determine 604 whether a type or classification for aspects of the session data correspond to a category and includes particular attributes, or types of attributes, for which a model (e.g., neural network or other machine learning algorithm) is to be trained. This can include, for example, a specific category for a customer support request, timestamp records, text of messages exchanged between customers and customer support agents, and the like.

If it is determined 606 that a portion of the customer support session data exhibits the attribute for a particular category, then that portion of the session data can be added 608 to the training set. If not, that portion of the session data can be excluded 610 from the training set. As mentioned elsewhere herein, in at least some embodiments, some of the session data may be instead added to a testing set or not added to any set but may have the attribute classification associated therewith.

If it is determined 612 that a full training set has been obtained, using any appropriate criterion as discussed or suggested herein, then the training set generation can complete, and the customer support session data can be stored 614 for training and other purposes. Otherwise, the process can continue until a full set is obtained, all of the relevant session data is analyzed, or another stop condition is satisfied.

Figure 7:
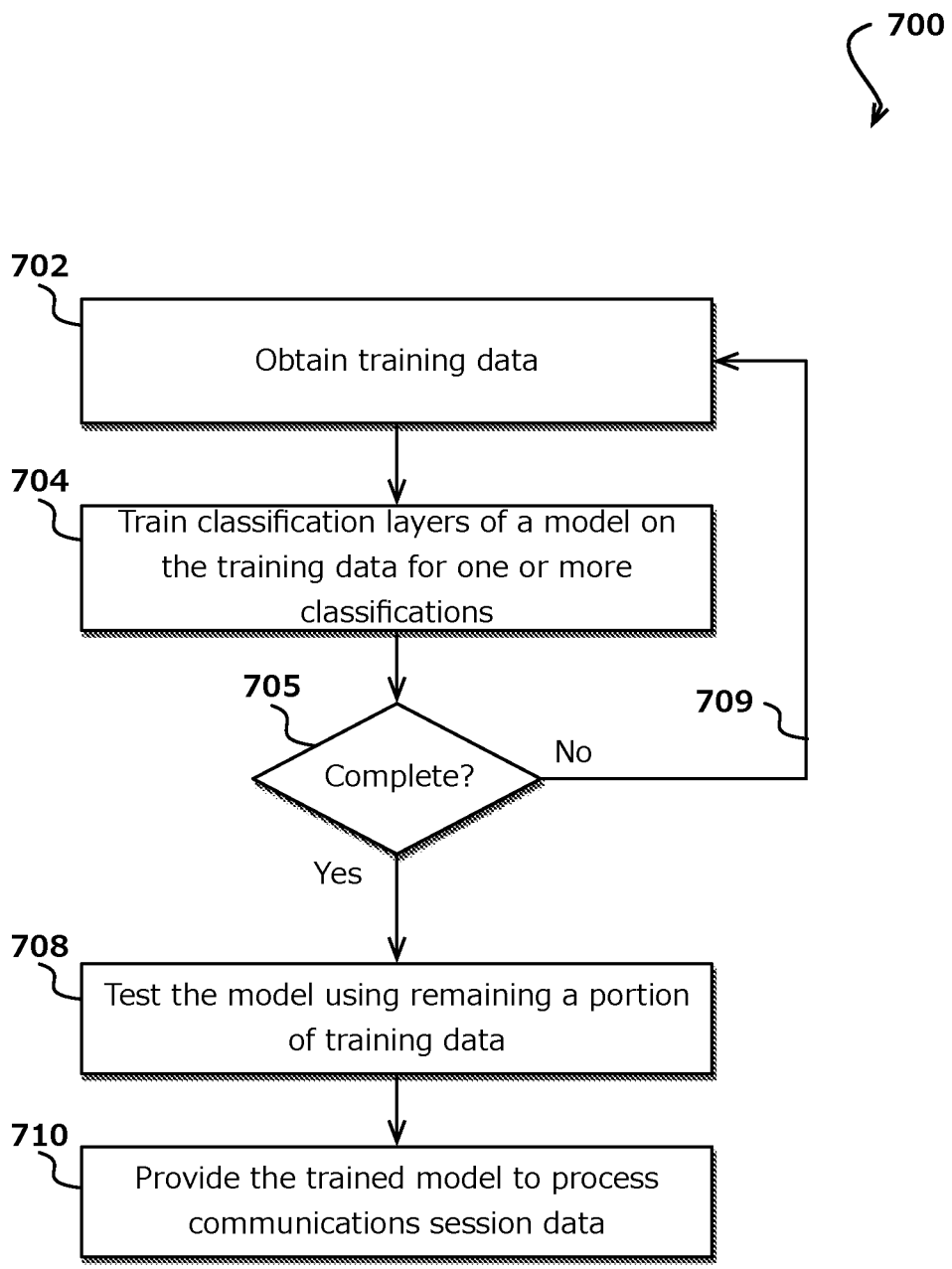
FIG. 7 illustrates an example process for training a model that can be utilized in accordance with various embodiments.

FIG. 7 illustrates an example process 700 for training a prediction model that can be utilized in accordance with various embodiments. Once a set of training data is obtained 702, the training data can be provided as input to the model training process. The training data can include, for example, customer support session data (e.g., times and text of messages exchanged between the customer and the customer support agent, etc.) or other communications session data between customers and customer support agents and data that indicates a type or classification for a specific category for a customer support request, timestamp records, text of messages exchanged between customers and customer support agents, and the like.

In the example of a neural network, the classification layers of the neural network, or other machine learning-based model, can be trained 704 on the training data to establish customer support sessions between customers and customer support agents and/or assign customer support requests to customer support agents or other resources.

The model can then learn various combinations or relations of features of customer support session data such that when session data is processed with the trained model, the trained model can recognize the features and output prediction information, including, for example, a next message prediction score, capacity score, or other such score, although various other outputs can be utilized as well within the scope of the various embodiments.

If it is determined 705 that a stop condition has been met so that training should be completed, such as by processing the entire training set or reaching a determined confidence threshold, then the trained model can be provided to process, for example, session data. As discussed herein, the model might first go through a process to test 708 using at least some of the training classified with the attribute type from earlier steps of the process. If the training is not complete, then the training process can continue 709 until a trained model is obtained. Thereafter, the trained model can be provided 710 to process communications session data to determine whether to establish a customer support session and/or assign a customer support request to a customer support agent.

Figure 8A:
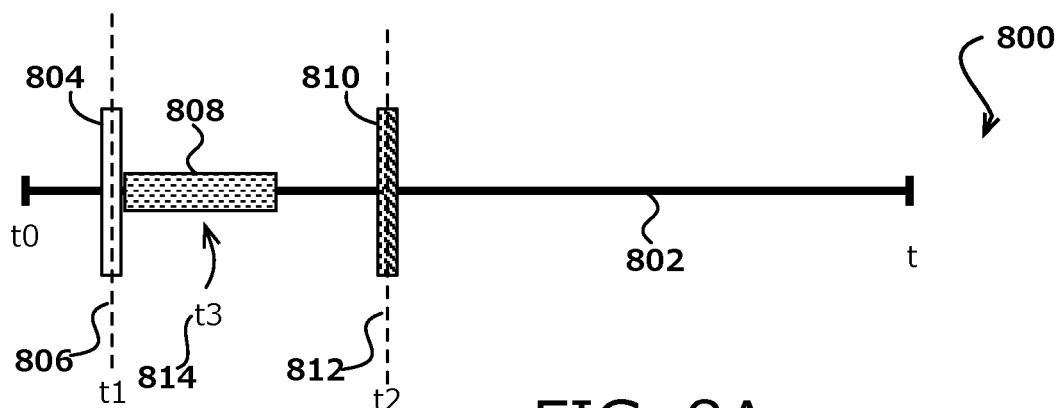
FIGS. 8A, 8B, and 8C illustrates example scheduling approaches in accordance with various embodiments.
Figure 8B:
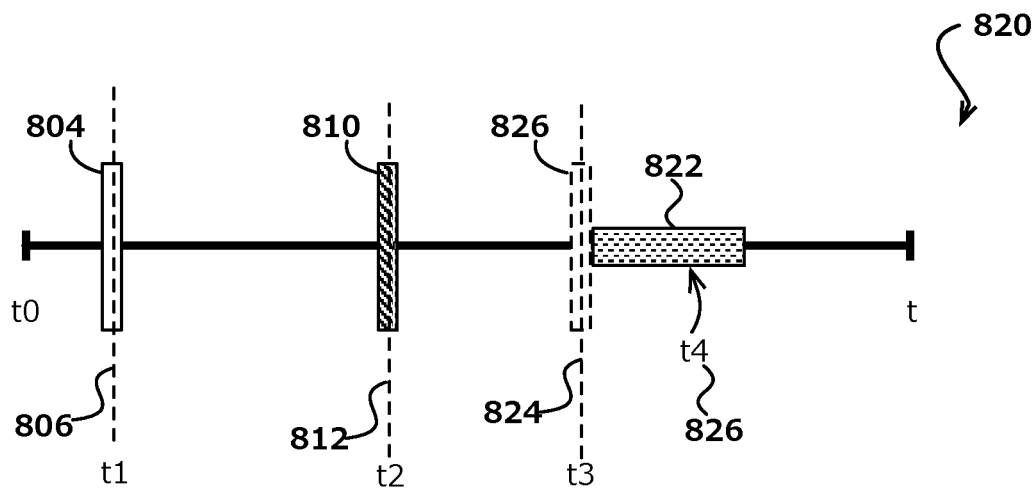
Figure 8C:
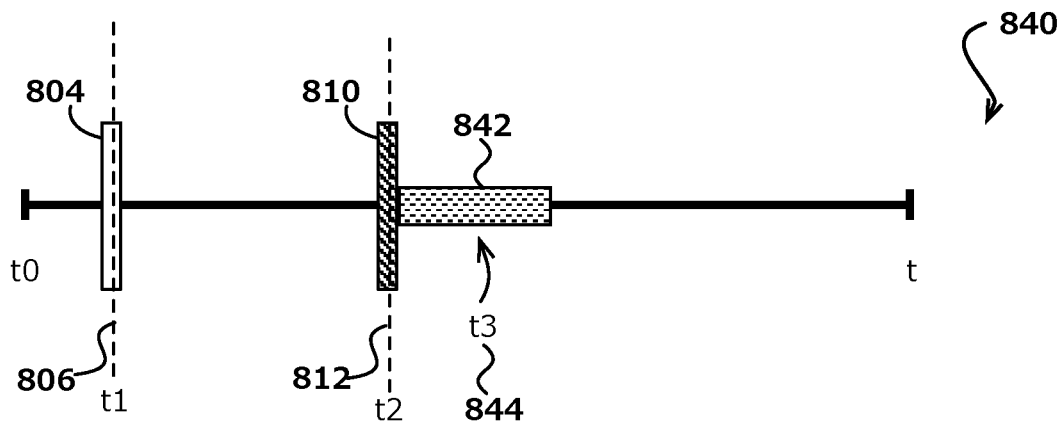

In accordance with various embodiments, various scheduling approaches can be utilized to select when to establish a customer support session and/or assign a customer support request to a customer support agent, as illustrated in FIGS. 8A, 8B, and 8C.

FIG. 8A illustrates example 800 of establishing a customer support session with a customer support agent and/or assigning a customer support request to the agent in accordance with various embodiments. In this example, a customer support session or other communications session is established between a customer and a customer support agent. Timeline 802 can include a timeline of customer support session data or other communications session data. For example, timeline 802 includes messages between the customer and the customer support agent during the customer support session. Customer message 804 is associated with timestamp 806 and customer support agent message 810 is associated with timestamp 812. Message 804 and 810 can include text describing the content of the respective messages. Timestamp 806 and 812 can include information identifying when the respective messages occurred. The timestamp can provide, for example, the date and time when the messages occurred. The time can include a number of measurements indicating when the messages occurred, including, for example, the date, hour, minute, second, etc. It should be noted that although messages 804 and 810 are shown, in accordance with various embodiments, additional or fewer messages between the customer and customer support agent can occur.

During the customer support session, a trained prediction model can process the text of customer message 804 and timestamp 806 to determine whether to establish an additional customer support session with the customer support agent and/or to assign an additional customer support request to the customer support agent. In the situation it is determined to establish an additional customer support session with the customer support agent and/or to assign an additional customer support request to the customer support agent, the additional session can be established and/or the request can be assigned, for example, after a most recent message from the customer. For example, as shown in FIG. 8A, customer message 804 corresponds to the most recent message from the customer, and an additional customer support session can be established and/or an assignment of an additional customer support request 808 can occur sometime after 814 customer message 804. The session may be established and/or the request may be assigned, for example, within a predetermined time or time range after customer message 804. In an example, the session may be established and/or the request assigned upon the most recent message of the customer occurring or at least within a threshold period time of the most recent message occurring, considering, for example, any processing and/or coordinating time. Thereafter, the customer support agent may send customer support agent message 810 to, for example, close out the customer support session, request feedback, or for some other purpose.

FIG. 8B illustrates example 820 of establishing a customer support session and/or assigning a customer support request to a customer support agent in accordance with various embodiments. In this example, during the customer support session, a trained model can process the text of customer message 804 and/or customer support agent message 810 as well as respective timestamps 806 and 812 to predict a time 824 for the next customer message 826. In the situation time 824 satisfies a time threshold, a session may be established and/or a request may be assigned 822 within a predetermined time or time range 826 of predicted time 824. In an embodiment, time 824 satisfies the time threshold when, for example, time 824 is higher than a predetermined amount of time. In the situation time 824 fails to meet the time threshold, the predicted time can be continually determined, or determined in accordance with a determined interval, and compared with the time threshold to determine whether to establish an additional customer support session and/or assign an additional customer support request to the customer support agent.

FIG. 8C illustrates example 840 of establishing a customer support session and/or assigning a customer support request to a customer support agent in accordance with various embodiments. In this example, a customer support session is established between a customer and a customer support agent. During the customer support session, a trained model can process the text of customer message 804 and timestamp 806 and/or the text of customer message 810 and timestamp 812 to determine whether to establish an additional customer support session with the customer support agent and/or to assign an additional customer support request to the customer support agent. In the situation it is determined to establish an additional customer support session with the customer support agent and/or to assign an additional customer support request to the customer support agent, the additional session can be established and/or the request may be assigned, for example, after most recent message 810 from the customer support agent. For example, in FIG. 8C, customer message 810 corresponds to the most recent message from the customer support agent, and an additional customer support session can be established and/or an additional customer support request assigned 842 after customer support message 810. The session may be established and/or the request may be assigned, for example, within a predetermined time or time range 844 after customer support 810. In an example, the session may be established and/or the request assigned upon the most recent message of the customer support agent occurring or at least within a threshold period time of the most recent message occurring, considering, for example, any processing and/or coordinating time.

Figure 9:
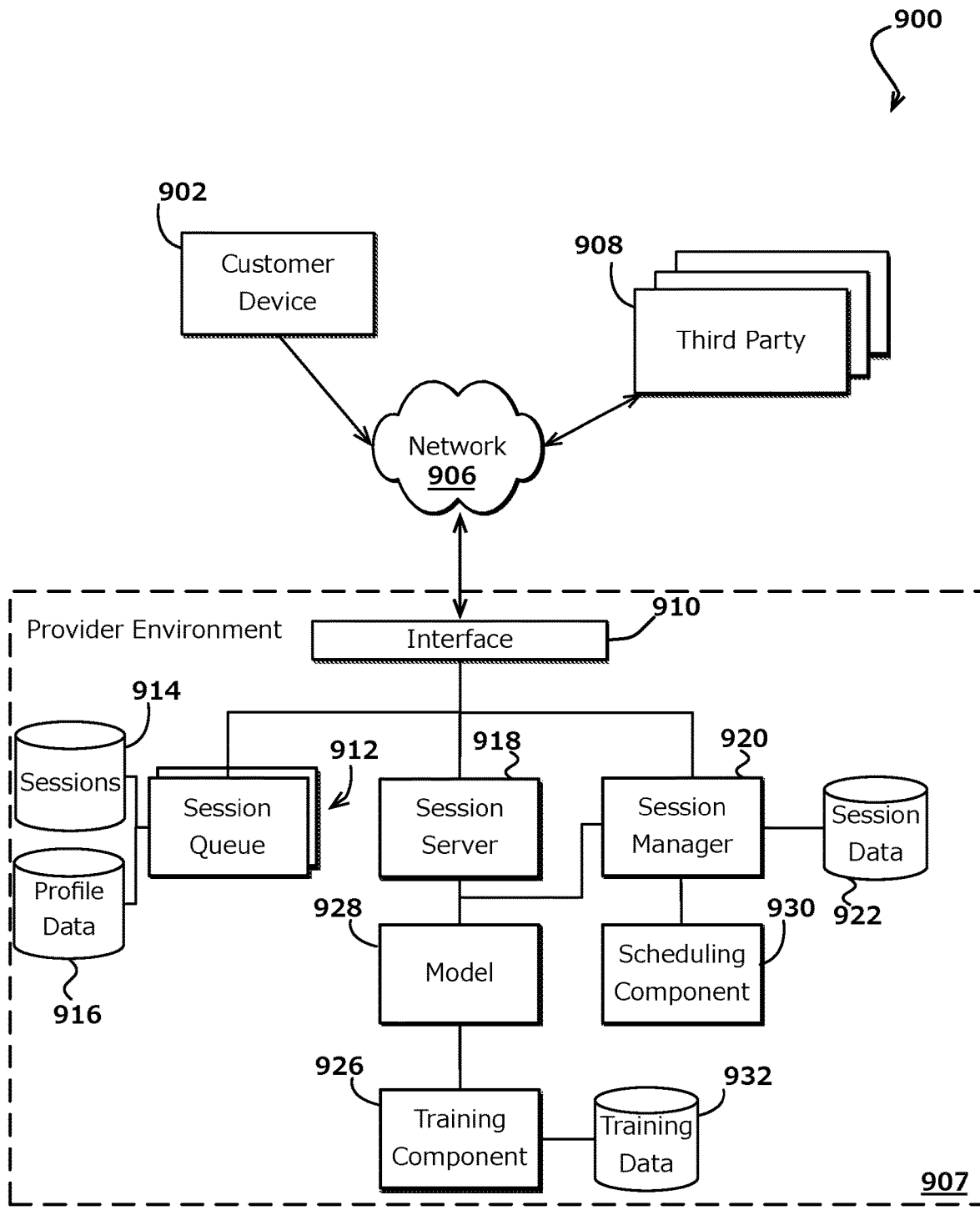
FIG. 9 illustrates an example environment in which aspects of the various embodiments can be implemented.

FIG. 9 illustrates an example environment 900 in which aspects of the various embodiments can be implemented. In this example, a user (e.g., a customer of a company) can utilize an application or interface, such as a browser, executing on customer device 902 to send requests (e.g., customer support requests) over at least one network 906. The requests can include customer support requests to a company, or entity associated with the company, for customer service, and a request from one of the customers may be assigned to a customer support agent or other appropriate resource.

The customer device 902 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

The request can be submitted using any appropriate technique, such as typing or speaking a request to an app running on a customer device (e.g., an app of the company or a third-party app created for processing customer support requests), typing or speaking a request on a web page, sending a text message, sending an email, etc. As used herein, a text message includes any message sent as text including but not limited to a message sent using SMS (short message service) or a special-purpose application (e.g., Facebook messenger, Apple iMessage, Google Hangouts, or WhatsApp).

In this example, customer device 902 is in communication with a resource provider 907 via the at least one network 906. In accordance with various embodiments, resource provider 907 can provide customer support services for various services. These services can include, for example, payment services, technical support services, human resource services, among other such services. In certain embodiments, provider 907 can be an intermediary between a customer of a company and a company, such as third party 908. For example, third-party 908 can utilize resource provider 907 to provide customer support to its customers to improve the customer support experience and to reduce overall customer support costs. For example, third-party 908 may find it more cost effective to use load management services of resource provider 907 than to implement its own load management services. In an example, third-party 908 can utilize provider 907 to provide customer support services to any number of companies as well as customers of those companies. This can include, for example, automatically responding to customer support requests, connecting a customer with a customer service representative (CSR), customer support agent, etc., selecting a CSR to process a customer support request, establishing customer support sessions between customers and CSRs, providing resources to CSRs to process customer support requests, etc. In another example, third-party 908 may utilize the services of a fourth-party company in providing support services to their customers, companies, and customers of those companies. In this example, services of service provider 907 can be provided to third-party 908 via the fourth-party company.

The at least one network can include a wired and/or wireless network, as may include the Internet, a cellular network, a local area network (LAN), an Ethernet, an Intranet, and the like. The customer device 902 may have varied local computing resources, such as may include central processing units and architectures, memory, mass storage, graphics processing units, communication network availability and bandwidth, etc.

Information associated with the request (e.g., customer support request) can be received to an interface and/or networking layer 910 of the resource provider 907. The information may include any relevant information, such as text of a message from the customer, information about a customer (e.g., an IP address, a customer ID, or authentication credentials), or information about a company from which the customer is seeking customer support (e.g., a company ID). The information may be received directly from a customer device or may be received via a server of a company from whom the customer is requesting support. In some embodiments, some information may be received directly from the customer device and some information may be received from a server of the company. The interface and/or networking layer can include any of a number of components known or used for such purposes, as may include one or more routers, switches, load balancers, Web servers, application programming interfaces (APIs), and the like.

Information for the request as well as information associated with the request can be directed to one or more session servers 918 or other appropriate component that can assign jobs or tasks such as customer support requests that can be queued or properly balanced using session manager 920, session queue 912, training component 926, model 928, and scheduling component 930, although additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In accordance with various embodiments, at least these components can make up a customer service management service that can determine when a customer support request is effectively resolved, and assign a customer support request to a resource (e.g., a customer support agent) and/or establish a customer support session with the customer support agent to maximize resource usage and reduce cost.

Once the request is received, session queue 912 can maintain a queue of the available customer support requests in the situation where there are no available customer support agents for the request. For example, information associated with the request can be stored in session data store 914 as well as information associated with the customer in profile data store 916 until such information is ready to be processed. The information can include, for example, text sent with or determined from the request, a customer ID, a company ID, etc. In the situation where such information is not available, the system can request the information or other information including, for example, information about the customer or information about the state of the company's services (e.g., service outages).

Requests can be maintained until it is determined a customer support agent has the capacity. For example, during a customer support session between a customer and a customer support agent, session manager 920 is operable to obtain and maintain customer support session data or other communications session data in data store 922. Session manager 920 can use model 928 (e.g., a neural network or other machine learning-based model) to process the customer support session data (e.g., times and text of messages exchanged between the customer and the customer support agent) to determine prediction information. As described, prediction information can include, for example, a next message prediction score, a predicted time for receiving a next message, a capacity score, or other such information. Based on the prediction information, a determination can be made whether to establish an additional customer support session with the customer support agent and/or assign an additional customer support request from session queue 912 to a customer support agent.

In the situation it is determined to establish an additional customer support session with the customer support agent and/or assign an additional customer support request from session queue 912 to the customer support agent, scheduling component 930 can provide scheduling information specifying a time to establish the additional customer support session with the customer support agent and/or assign the additional customer support request to the customer support agent. The scheduling information can specify, for example, that a customer support session is to be established and/or a customer support request is to be assigned after a most recent message from a customer, after a most recent message from the customer support agent, at a predicted time, or some other time. Session server 918 is operable to, for example, establish the customer support session with the customer support agent and/or assign the customer support request to the customer support agent based on the scheduling information.

In accordance with various embodiments, during a preprocessing stage, customer support session data can be obtained and stored in data store 932. The session data can be obtained from, for example, company records, customer support logs, customer profiles, customer agent profiles, or otherwise obtained. In certain embodiments, the training data can be from one or more data stores maintained directly or indirectly by customer support service provider 907 or third party 908, or from multiple sources, among other such options. The session data can include, for example, times of messages exchanged between customers and customer support agents, text of the messages, statistical relationships (e.g., average time, minimum time, maximum time, etc.) related to the times of messages, company records of previous interactions between customers and customer support agents, etc.

As part of a preprocessing process, session data or other information associated with the session data can be used by training component 926 to determine whether a type or classification for aspects of the session data correspond to a category and includes particular attributes, or types of attributes, for which model (e.g., neural network or other machine learning algorithm) 928 is to be trained. This can include, for example, a specific category for a customer support request, timestamp records, text of messages exchanged between customers and customer support agents, and the like. Training component 926 can perform the training on model 928 and provide the resulting results and/or trained classifiers or models for use in determining whether to establish customer support sessions between customers and customer support agents and/or assign customer support requests to customer support agents or other resources.

In certain embodiments, training model 928 may involve significant use of computation resources and time, such that this may correspond to a preparatory step to processing session data and/or performed relatively infrequently and/or according to a schedule.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the system. For example, the system can include various modules and components combined on a single device, multiple instances of a single module or component, etc. In one specific, non-limiting embodiment, session queue 912, session manager 920, scheduling component 930, and model 928, can execute on one device and session server 918 can execute on another device, and training component can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 10:
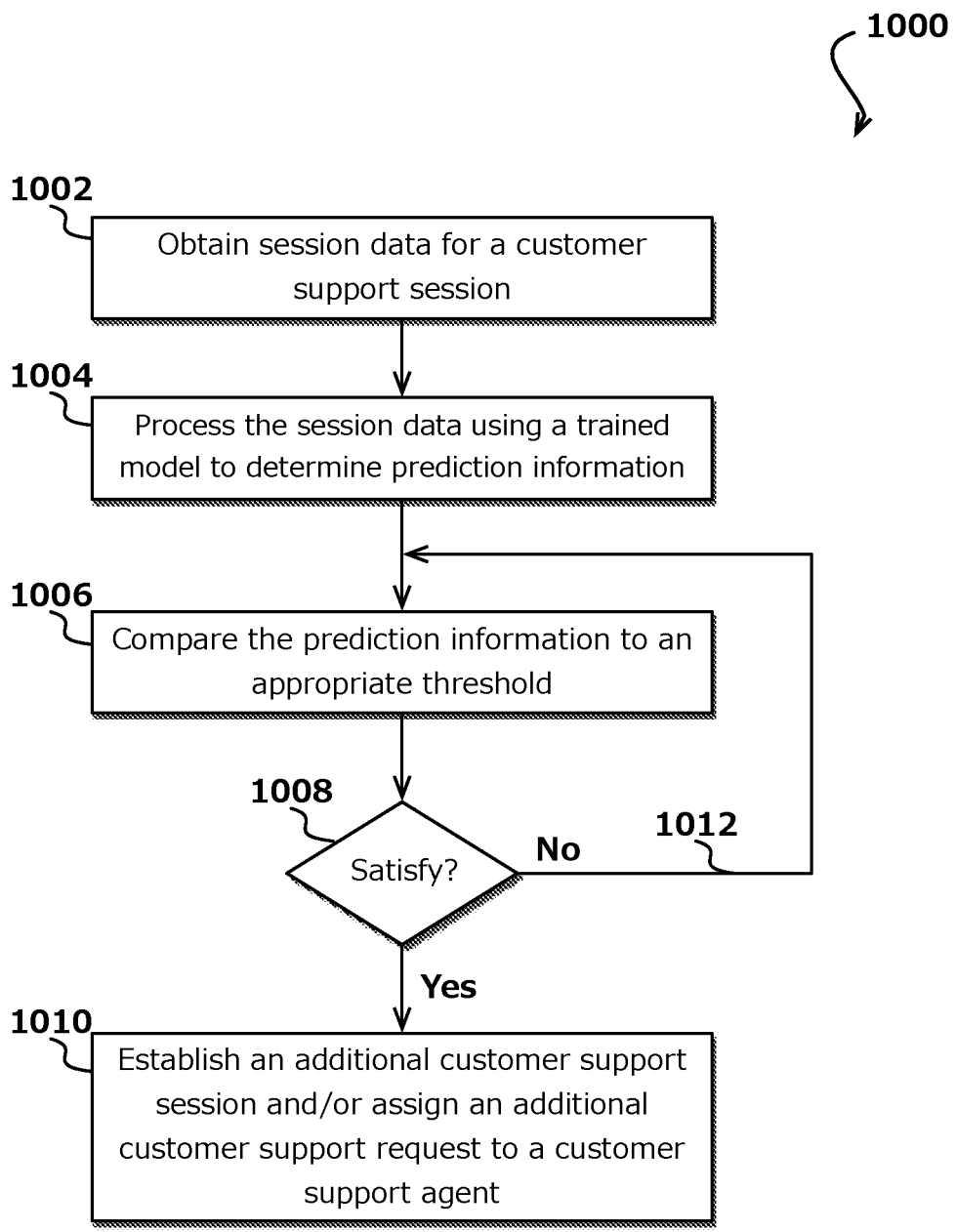
FIG. 10 illustrates an example process for automatically establishing customer support sessions and/or assigning customer support requests in accordance with various embodiments.

FIG. 10 illustrates an example process 1000 for automatically establishing customer support sessions and/or assigning customer support requests in accordance with various embodiments. In this example, session data such as communications session data can be obtained 1002 during a customer support session or other communications session between a customer and a customer support agent. Session data can include, for example, a description of an issue for which a customer wants to receive customer service, called a customer support request, a category for the customer support request (e.g., billing, tech support, etc.), average customer response time between messages during the customer support session, the total number of customer and customer support agent messages during the customer support session, the average number of messages over a period of time (e.g., one minute) during the customer support session, the amount of time elapsed since a previous messages, customer support agent activity (e.g., keystrokes, resource usage, etc.), resource activity (e.g., router activity, database activity, etc.)

A trained prediction model (e.g., a neural network or other machine learning-based model) can process 1004 the session data (e.g., times and text of messages exchanged between the customer and the customer support agent) to determine prediction information. Prediction information can include, for example, a next message prediction score, a predicted time for receiving a next message, a capacity score, or other such information.

The prediction information can be compared 1006 to an appropriate threshold to determine 1008 whether to establish a new customer support session with the customer support agent and/or to assign a customer support request to the agent. In the situation where the prediction information satisfies the threshold, an additional customer support session can be established 1010 with the customer support agent and/or an additional customer support request can be assigned to the customer support agent. In the situation where the information does not satisfy the threshold, the prediction information can be continually determined 1012, or determined in accordance with a determined interval, and compared 1006 with the threshold to determine whether to establish an additional customer support session with the customer support agent and/or assign an additional customer support request to the customer support agent.

Figure 11:
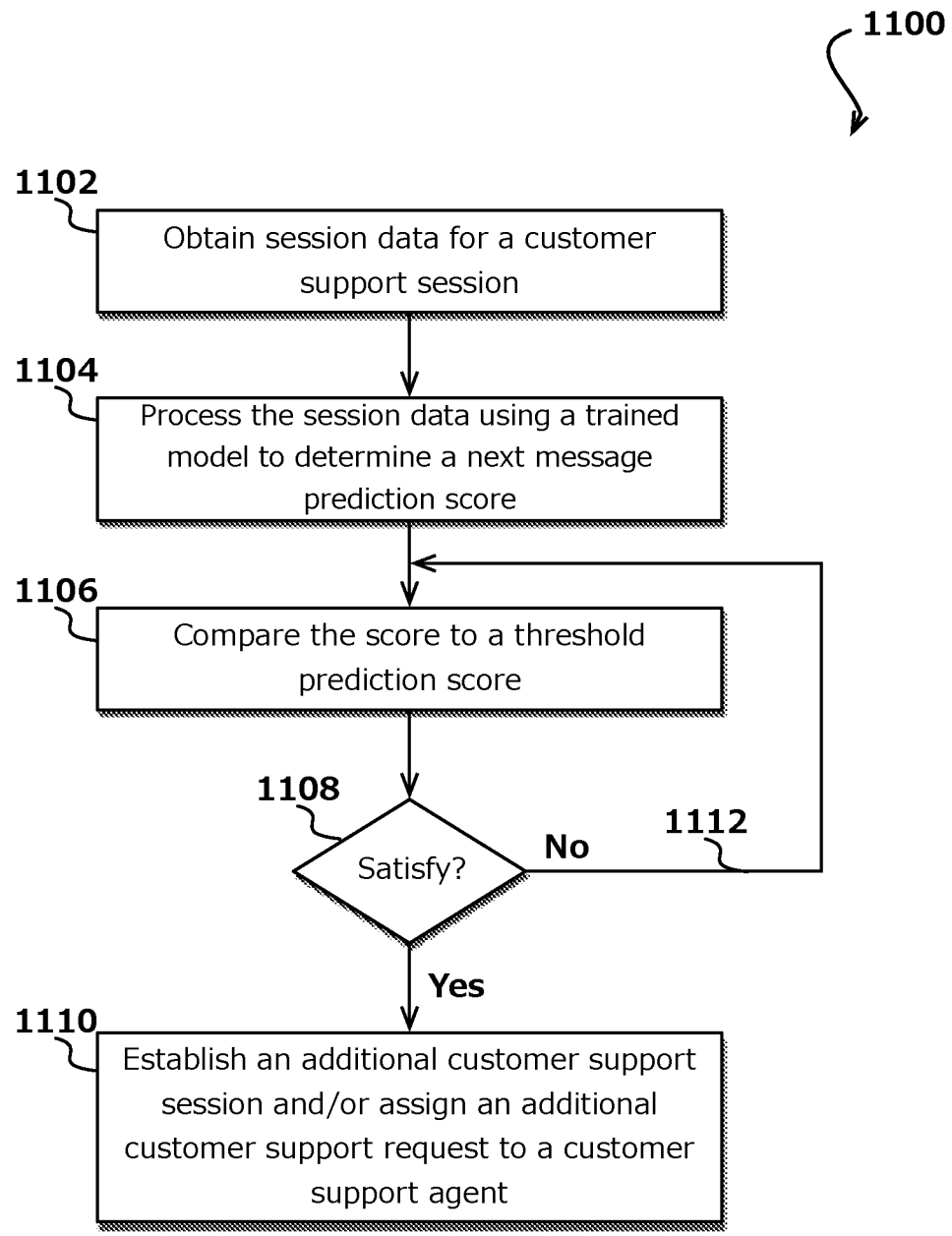
FIG. 11 illustrates an example process for establishing customer support sessions and/or assigning customer support requests in accordance with an alternate embodiment.

FIG. 11 illustrates an example process 1100 for establishing customer support sessions and/or assigning customer support requests in accordance with an alternate embodiment. In this example, session data such as communications session data obtained 1102 during a customer support session or other communications session between a customer and a customer support agent is processed 1104 using a trained prediction model to determine a next message prediction score. It should be noted that although FIG. 11 is described with respect to a next message prediction score, embodiments described herein are not limited to using a next message prediction score to determine whether to establish a customer support session and/or assign a customer support request to a customer support agent. In various embodiments, other information may be determined from customer support session information and used in the determination. For example, the information can include a predicted time for receiving a next message, a capacity score, etc.

The next message prediction score can quantify a probability of receiving a message from a customer with respect to a reference event and/or time. The reference event and/or time can include, for example, the time at which the session data that was used to determine the next message prediction score was received, the time the last customer message occurred, the time the last customer support agent message occurred, etc. The probability can correspond to, for example, a number between zero and one, one and one hundred, or another value that can be compared to a threshold. In certain embodiments, the next message prediction score can include a set of probabilities, where each probability can be associated with a specific time (e.g., two minutes) or a range of time (e.g., 2-3 minutes). For example, the set of probabilities can specify that in one minute there is a twenty-five percent chance of receiving a message from the customer, in two minutes there is a forty percent chance of receiving a message from the customer, in three minutes there is a sixty percent chance of receiving a message from the customer, and so on.

Once the next message prediction score is determined, the score can be compared 1106 to a threshold prediction score, and a determination 1108 whether to establish a customer support session and/or assign a customer support request to the customer support agent can be made 1108. For example, the probability of receiving a next message for a predetermined period of time (e.g., the probability of receiving a next message in three minutes) can be compared to a threshold probability for that predetermined period of time.

In the situation where the next message prediction score satisfies the threshold prediction score, an additional customer support session can be established and/or an additional customer support request can be assigned 1110 to the customer support agent. In the situation where the next message prediction score does not satisfy the threshold prediction score, the prediction score can be continually determined 1112, or determined in accordance with a determined interval, and compared 1106 with the threshold prediction score to determine whether to establish an additional customer support session and/or assign an additional customer support request to the customer support agent.

Figure 12:
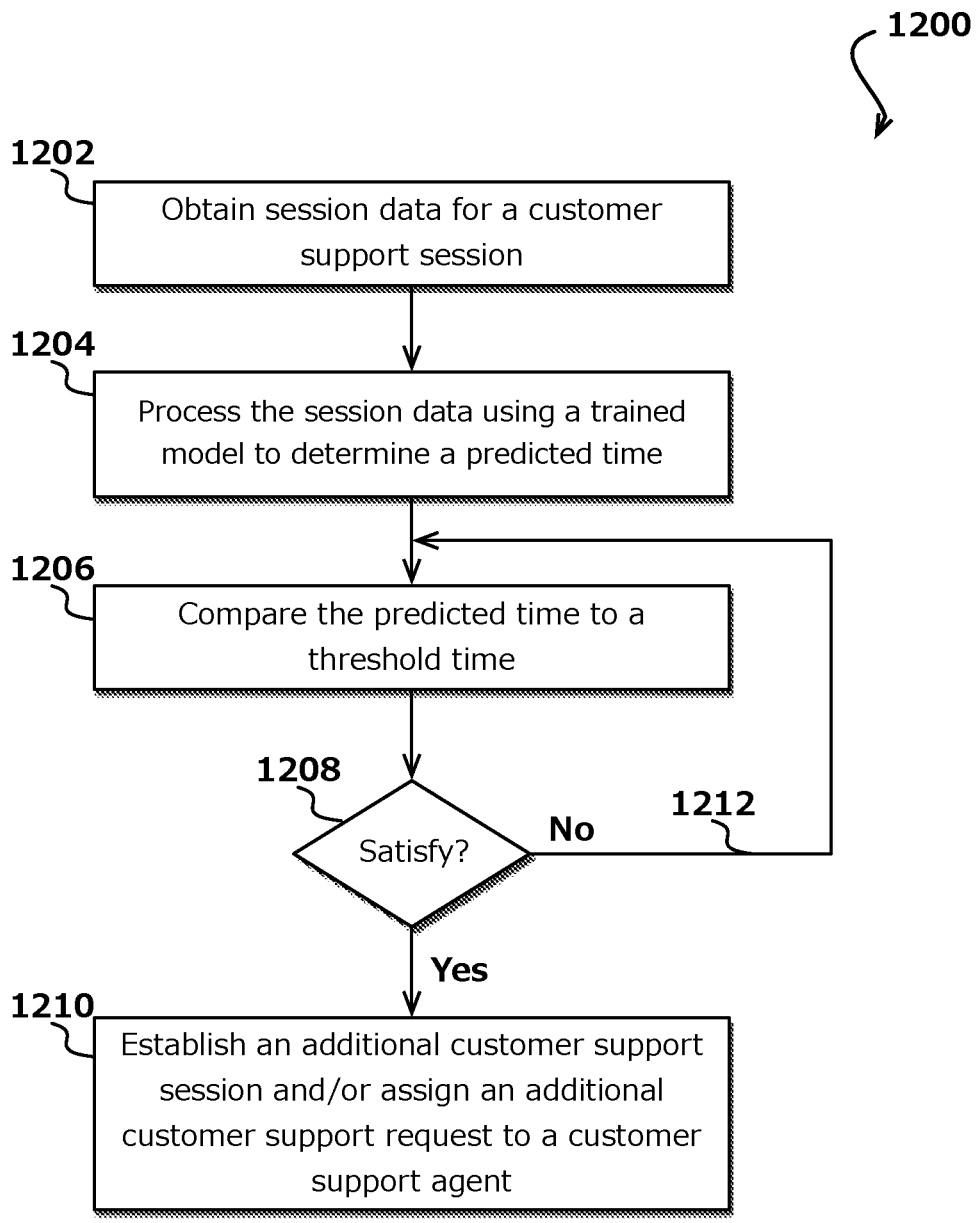
FIG. 12 illustrates an example process for establishing customer support sessions and/or assigning customer support requests in accordance with an alternate embodiment.

FIG. 12 illustrates an example process 1200 for establishing customer support sessions and/or assigning customer support requests in accordance with an alternate embodiment. As described in FIGS. 10 and 11, session data or communications session data can be obtained 1202 during a customer support session or other communications session between a customer and a customer support agent. The session data can be processed 1204 using a trained prediction model to determine a predicted time for receiving a next message. The predicted time can specify, e.g., a particular amount of time (e.g., two minutes), range of times (between two and four minutes), a time of the day (e.g., 10:32 am), etc. for receiving a next message from the customer.

The predicted time can be compared 1206 to a threshold time, and a determination 1208 whether to establish a customer support session and/or assign a customer support request to the customer support agent can be made. For example, the predicted time for receiving a next message can correspond to an amount of time (e.g., three minutes), and the amount of time can be compared to a threshold amount of time. In another example, the predicted time for receiving the next message can correspond to a time of day, and the time of day can be compared to a threshold time of day.

In the situation where the predicted time satisfies the threshold time, an additional customer support session can be established and/or an additional customer support request can be assigned 1210 to the customer support agent. In the situation where the predicted time does not satisfy the threshold time, the predicted time can be continually determined 1212, or determined in accordance with a determined interval, and compared 1206 with the threshold time to determine whether to establish an additional customer support session and/or assign an additional customer support request to the customer support agent.

Figure 13:
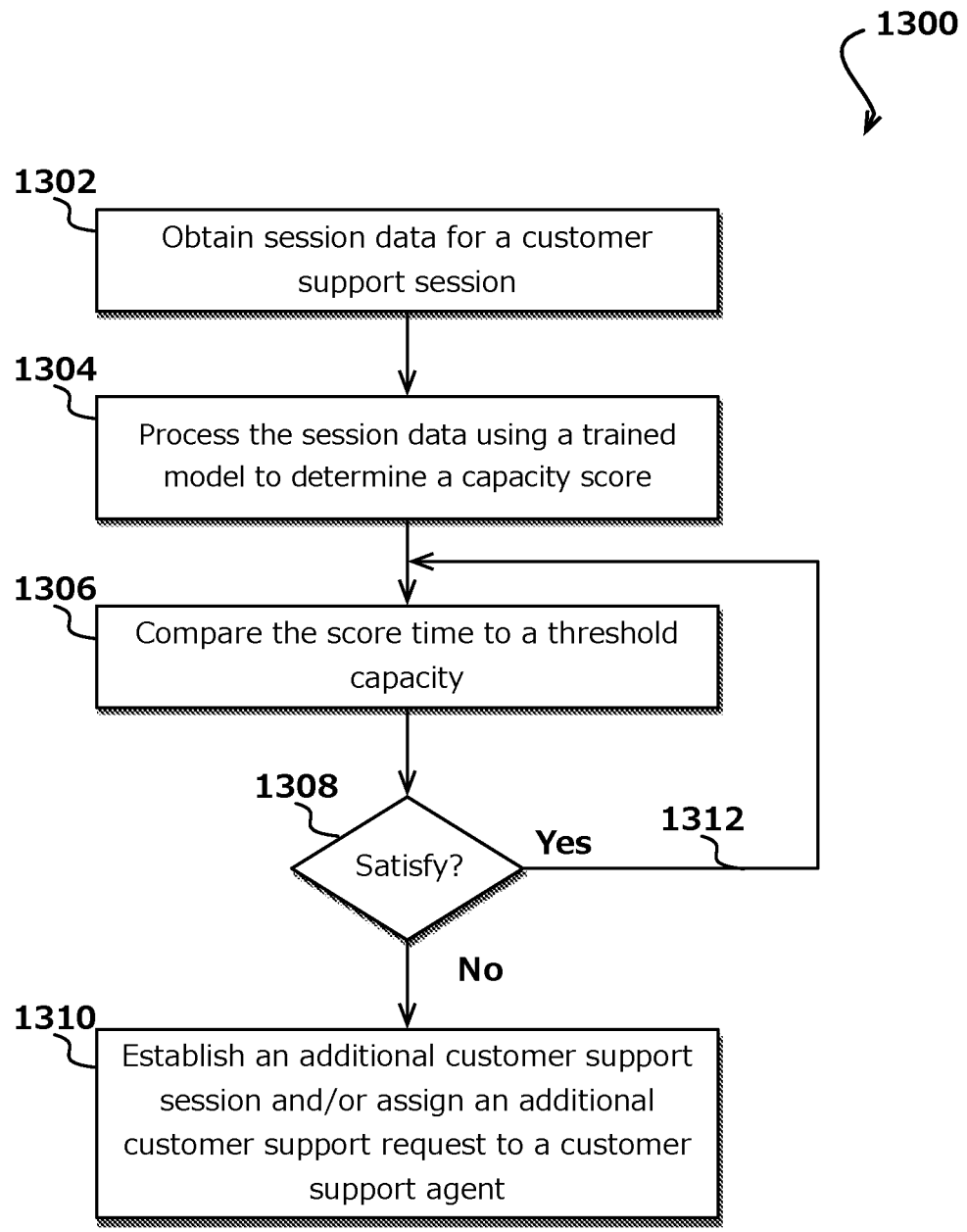
FIG. 13 illustrates an example process for establishing customer support sessions and/or assigning customer support requests in accordance with an alternate embodiment.

FIG. 13 illustrates an example process 1300 for establishing customer support sessions and/or assigning customer support requests in accordance with an alternate embodiment. In this example, session data for each customer support session between a customer support agent and one or more customers is obtained 1302. The session data for each session can be processed 1304 using a trained prediction model to determine a capacity score for the customer support agent. The capacity score can, for example, quantify a total amount of work currently being processed by the customer support agent or quantify a capacity for additional work by the customer support agent. In certain embodiments, the capacity score can be based on one or more occupancy scores. For example, the trained model can be utilized to analyze session data for each customer support session to determine an occupancy score for individual customer support sessions. An occupancy score can, e.g., quantify an amount of work being performed for a particular customer support session. Once the occupancy scores are determined, the scores can be combined to determine a capacity score. In accordance with various embodiments, the occupancy scores can be combined using any one of a number of different combination approaches, including, for example, a normalized combination approach, a weighted combination approach, etc. in certain embodiments, a list of customer support sessions or other communications sessions being processed by the customer support agent can be obtained. The list of customer support sessions can be processed to determine a total number of messages between the agent and customers over a period of time. In an embodiment, the capacity score can be the ratio of the total number of messages and the period of time.

The capacity score can be compared 1306 to a threshold capacity, and a determination 1308 whether to establish a customer support session and/or assign a customer support request to the customer support agent can be made. In the situation where the capacity score does not satisfy the capacity threshold (i.e., the customer support agent has the capacity for additional work), an additional customer support session can be established and/or an additional customer support request can be assigned 1310 to the customer support agent. In the situation where the capacity score does satisfy the capacity threshold (i.e., the customer support agent does not have the capacity for additional work), the capacity score can be continually determined 1312, or determined in accordance with a determined interval, and compared 1306 with the threshold time to determine whether to establish an additional customer support session and/or assign an additional customer support request to the customer support agent.

Figure 14:
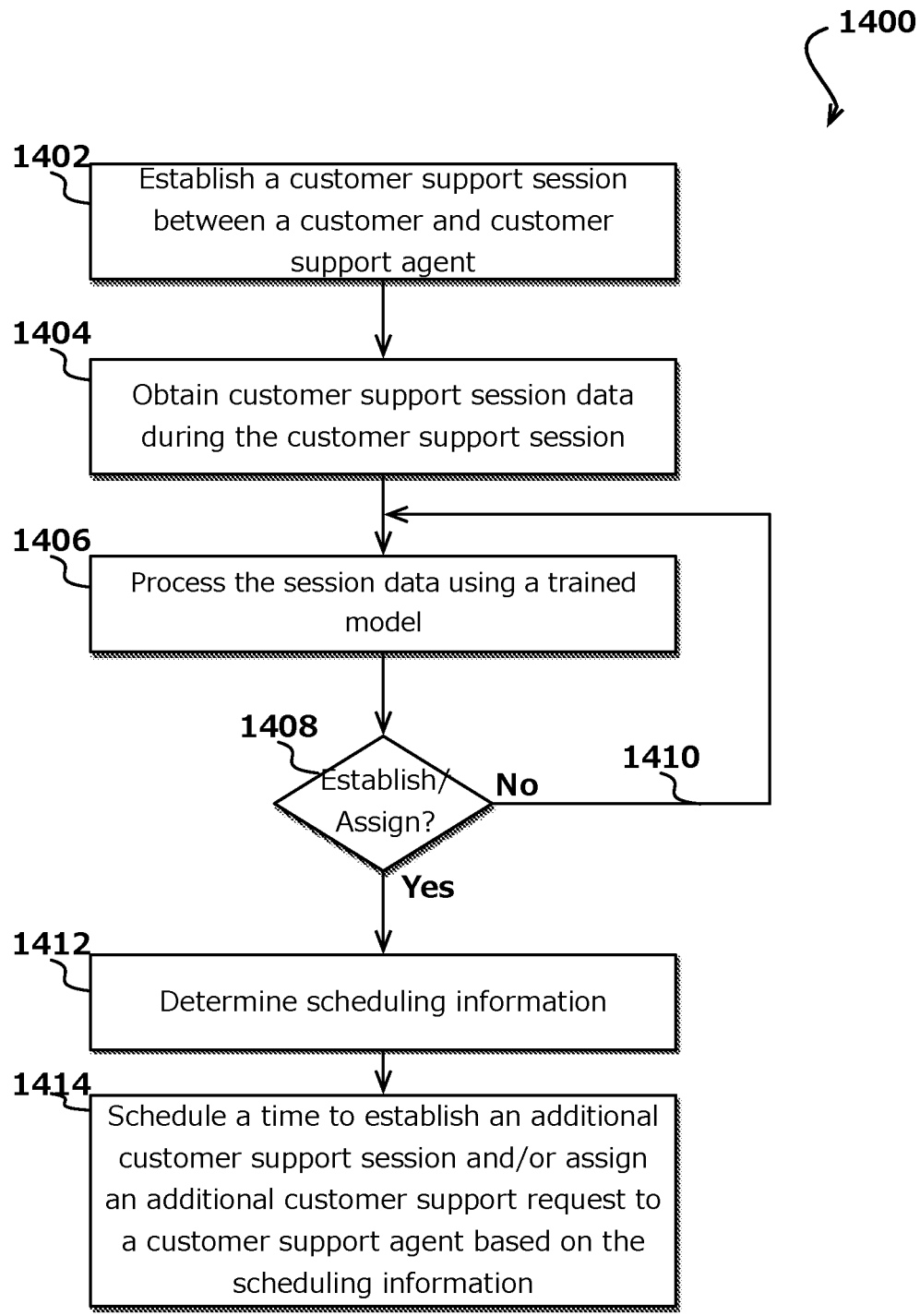
FIG. 14 illustrates an example process for scheduling customer support sessions and/or assigning customer support requests in accordance with various embodiments.

FIG. 14 illustrates an example process 1400 for scheduling when to establish customer support sessions and/or when to assign customer support requests in accordance with various embodiments. In this example, a customer support session or other communications session is established 1402 between a customer and a customer support agent. During the customer support session, customer support session data can be obtained 1404. In accordance with various embodiments, session data can include, for example, text of messages between the customer and the customer support agent during the customer support session. The messages can be associated with timestamp data that includes information identifying when a message occurred. The timestamp can provide, for example, the date and time when the messages occurred. The time can include a number of measurements when the messages occurred, including, for example, the date, hour, minute, second, etc.

The customer support session data can be processed 1406 by a model to determine 1408 whether to establish an additional customer support session with the customer support agent and/or to assign an additional customer support request to the customer support agent. As described herein, the determination can be based on prediction information, where prediction information can include, for example, a next message prediction score, a predicted time for receiving a next message, a capacity score, or other such information.

In the situation it is determined not to establish an additional session and/or assign an additional request, the customer support data can be monitored 1410 and processed 1406. In the situation where it is determined to establish an additional customer support session with the customer support agent and/or to assign an additional customer support request to the customer support agent, scheduling information can be determined 1412. The scheduling information can be used to schedule 1414 a time to establish an additional customer support session with the customer support agent and/or to assign an additional customer support request to the customer support agent. In accordance with various embodiments, the scheduling information can be based on a service level policy or other information. The service level policy can be established by a company, a resource provider, or other entity. The service level policy can specify times or events for which to establish a customer support session with the customer support agent and/or to assign a customer support request to the customer support agent. For example, based on the service level policy, the scheduling information can specify that a session can be established and/or the request can be assigned, for example, after a most recent message from the customer, after a most recent message from the customer support agent, at a predicted time, or some other time.

Figure 15:
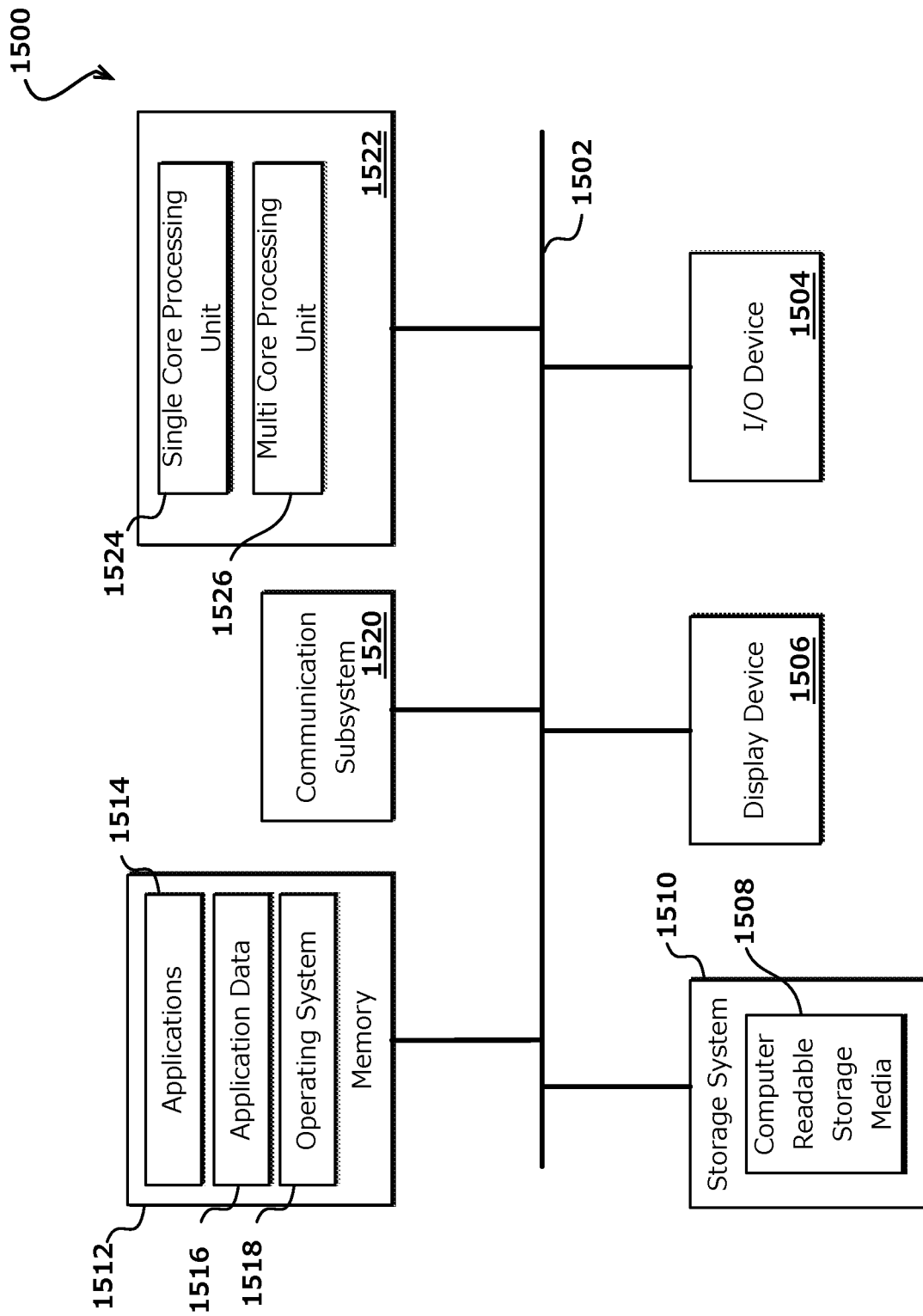
FIG. 15 illustrates an example configuration of components of a device.

FIG. 15 illustrates a set of basic components of an electronic computing device 1500, such as computing device 122 in FIG. 1. In various embodiments, computer system 1500 may be used to implement any of the systems, devices, or methods described herein. In some embodiments, computer system 1500 may correspond to any of the various devices described herein, including, but not limited, to mobile devices, tablet computing devices, wearable devices, personal or laptop computers, vehicle-based computing devices, or other devices or systems described herein. As shown in FIG. 15, computer system 1500 can include various subsystems connected by a bus 1502. The subsystems may include an I/O device subsystem 1504, a display device subsystem 1506, and a storage subsystem 1510 including one or more computer-readable storage media 1508. The subsystems may also include a memory subsystem 1512, a communication subsystem 1520, and a processing subsystem 1522.

In system 1500, bus 1502 facilitates communication between the various subsystems. Although a single bus 1502 is shown, alternative bus configurations may also be used. Bus 1502 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1502 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1504 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1504 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1500 may include a display device subsystem 1506. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1506 may include a controller and/or interface for controlling and/or communicating with an external display, such as any of the above-mentioned display technologies.

As shown in FIG. 15, system 1500 may include storage subsystem 1510 including various computer-readable storage media 1508, such as hard disk drives, solid-state drives (including RAM-based and/or flash-based SSDs), or other storage devices. In various embodiments, computer-readable storage media 1508 can be configured to store software, including programs, code, or other instructions, that is executable by a processor to provide the functionality described herein. For example, the instructions, when executed, can enable a computing device to perform automated document negotiation in accordance with the present disclosure may be embodied on a computer-readable medium. This may include automatically obtaining information from parties seeking to negotiate document sections of a document such as a contract; generating a ranking value or other such document selection value for a plurality of candidate contracts possible between the parties based on information from the parties, including their preferences for different sections (e.g., provisions) of the contract; and using the values to optimize an optimization function (e.g., a cost function or other such function) that measures the degree to which candidate contracts satisfy the information provided by the parties to determine a document or document information that satisfies constraints of the parties.

In some embodiments, storage system 1510 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1510 can include a media reader, card reader, or other storage interfaces to communicate with one or more external and/or removable storage devices. In various embodiments, computer-readable storage media 1508 can include any appropriate storage medium or combination of storage media. For example, computer-readable storage media 1508 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1512 can include various types of memory, including RAM, ROM, flash memory, or other memory. Memory 1512 can include SRAM (static RAM) or DRAM (dynamic RAM). In some embodiments, memory 1512 can include a BIOS (basic input/output system) or other firmware configured to manage initialization of various components during, e.g., startup. As shown in FIG. 15, memory 1512 can include applications 1514 and application data 1516. Applications 1514 may include programs, code, or other instructions, that can be executed by a processor. Applications 1514 can include various applications such as browser clients, campaign management applications, data management applications, and any other application. Application data 1516 can include any data produced and/or consumed by applications 1514. Memory 1512 can additionally include operating system 1518, such as macOS®, Windows®, Linux®, various UNIX® or UNIX- or Linux-based operating systems, or other operating systems.

System 1500 can also include a communication subsystem 1520 configured to facilitate communication between system 1500 and various external computer systems and/or networks (such as the Internet, a local area network (LAN), a wide area network (WAN), a mobile network, or any other network). Communication subsystem 1520 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1520 can include hardware and/or software components to communicate with satellite-based or ground-based location services, such as GPS (global positioning system). In some embodiments, communication subsystem 1520 may include, or interface with, various hardware or software sensors. The sensors may be configured to provide continuous or and/or periodic data or data streams to a computer system through communication subsystem 1520

As shown in FIG. 15, processing system 1522 can include one or more processors or other devices operable to control computing system 1500. Such processors can include single-core processors 1524, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1522, such as processors 1524 and 1526, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
   at least one processor; and
   memory including instructions that, when executed by the at least one processor, enables the computing system to:
      obtain training data that includes times and text of messages exchanged between customers and customer support agents for a plurality of customer support sessions;
      train a prediction model on the training data, the prediction model configured to process customer support session data between the customers and the customer support agents to compute a next message prediction for each of the plurality of customer support sessions, the next message prediction specifying a start time and an end time for receiving a message, wherein the next message prediction is associated with a confidence score quantifying a probability of receiving the message from a customer within the start time and the end time;
      establish a customer support session between a first customer and a customer support agent in response to a customer support request by the first customer, the customer support agent being associated with a work queue that comprises a number of slots, wherein the number of slots is associated with a first limit specifying a maximum number of simultaneous customer support requests that can be handled by the customer support agent, individual slots capable of being associated with a customer support request;
      determine that a number of customer support requests associated with the work queue has reached the maximum number of simultaneous customer support requests associated with the customer support agent, wherein the maximum number is associated with the first limit of slots in the work queue;
      obtain, during the customer support session, customer support session data, the customer support session data including times and text of messages exchanged between the first customer and the customer support agent;
process the customer support session data with the prediction model to determine a next message prediction for the customer support session, the next message prediction specifying a start time and an end time for receiving a next message from the first customer and being associated with a confidence score for receiving the next message from the first customer within the start time and the end time;
determine, in response to the first limit being reached and based on the start time, the end time, and the confidence score, that the work queue comprises slack capacity, wherein the slack capacity indicates additional availability for a type of customer support request when the first limit is reached;
update the first limit of the number of slots in the work queue to a second limit based on the slack capacity;
identify an additional customer support request from a plurality of customer support requests that is associated with the type of customer support request; and
assign the additional customer support request from a second customer to the customer support agent during a time when the first limit is reached, based at least in part on the second limit and the type of customer support request, and the start and the end time.

2. The computing system of claim 1, wherein the instructions when executed by the at least one processor further enables the computing system to:
determine the next message prediction satisfies a threshold prediction;
determine a timestamp associated with a most recent message from the first customer; and
assign the additional customer support request to the customer support agent within a predetermined time of the timestamp.

3. The computing system of claim 1, wherein the instructions when executed by the at least one processor further enables the computing system to:
determine the next message prediction satisfies a threshold prediction;
determine a timestamp associated with a most recent message from the customer support agent; and
assign the additional customer support request to the customer support agent in within a predetermined time of the timestamp.

4. The computing system of claim 1, wherein the instructions when executed by the at least one processor further enables the computing system to:
determine that an amount of time between the start time and the end time satisfies a threshold amount of time; and
assign the additional customer support request to the customer support agent within a determined time of one of the start time and the end time.

5. A computing system, comprising:
at least one processor; and
memory including instructions that, when executed by the at least one processor, enables the computing system to:
obtain training data that includes times and text of messages exchanged between users for a plurality of customer support sessions,
train a prediction model on the training data, the prediction model configured to process communications session data between the users to compute next message prediction for the plurality of customer support sessions, the next message prediction specifying a time period for receiving a message, wherein the next message prediction is associated with a confidence score quantifying a probability of receiving the message within a period of time,
establish a communications session between a first user and a second user in response to a customer support request by the second user, the second user being associated with a work queue that comprises a number of slots, wherein the number of slots is associated with a first limit specifying a maximum number of simultaneous customer support requests that can be handled by the first user, individual slots capable of being associated with a customer support request,
determine that a number of customer support requests associated with the work queue has reached the maximum number of simultaneous customer support requests associated with the first user, wherein the maximum number is associated with the first limit of slots in the work queue,
obtain, during the communications session, communications session data, the communications session data including times and text of at least one message exchanged between the first user and the second user,
process the communications session data with the prediction model to determine a next message prediction, the next message prediction specifying a predicted start time and end time for receiving a next message from the second user and being associated with a confidence score for receiving the next message from the second user within the predicted start time and end time,
determine, in response to the first limit being reached and based on the predicted start time and end time and the confidence score, that the work queue comprises slack capacity, wherein the slack capacity indicates additional availability for a type of customer support request when the first limit is reached,
update the first limit of the number of slots in the work queue to a second limit based on the slack capacity,
identify an additional customer support request from a plurality of customer support requests that is associated with the type of customer support request, and
determine whether to establish a second communications session between the first user and a third user during a time when the first limit is reached, based at least in part on the second limit, slack capacity, the type of customer support request, and the predicted start time and end time.

6. The computing system of claim 5, wherein the first user is a customer support agent, the second user is a first customer, and the third user is a second customer.

7. The computing system of claim 5, wherein the instructions when executed by the at least one processor further enables the computing system to:
determine the predicted start time and end time satisfies a threshold prediction;
determine a timestamp associated with a most recent message from the second user; and
establish the second communications session between the first user and the third user within a predetermined time of the timestamp.

8. The computing system of claim 5, wherein the instructions when executed by the at least one processor further enables the computing system to:

determine the predicted start time and end time satisfies a threshold prediction;

determine a timestamp associated with a most recent message from the first user; and establish the second communications session between the first user and the third user within a predetermined time of the timestamp.

9. The computing system of claim 5, wherein the instructions when executed by the at least one processor further enables the computing system to:

determine the period of time specified by the predicted start time and end time satisfies a threshold amount of time; and establish the second communications session between the first user and the third user within a determined time of the predicted start time.

10. The computing system of claim 5, wherein the communications session data includes at least one of a customer intent for a communications session, times of the at least one message, a first user profile, a second user profile, or a third user profile.

11. The computing system of claim 5, wherein the instructions when executed to determine whether to establish the second communications session by the at least one processor further enables the computing system to:

establish the second communications session between the first user and the third user based at least in part on a service level policy.

12. The computing system of claim 5, wherein the instructions when executed to determine the slack capacity by the at least one processor further enables the computing system to:

obtain a list of communications sessions being processed by the first user, and process the list of communications sessions with the prediction model to determine the slack capacity for the first user.

13. The computing system of claim 5, wherein the instructions when executed by the at least one processor further enables the computing system to:

receive a customer support request; and establish the communications session between the first user and the second user.

14. A computer-implemented method, comprising:

obtaining training data that includes times and text of messages exchanged between users for a plurality of customer support sessions, training a prediction model on the training data, the prediction model configured to process communications session data between the users to compute next message prediction for the plurality of customer support sessions, the next message prediction specifying a time period for receiving a message, wherein the next message prediction is associated with a confidence score quantifying a probability of receiving the message within a period of time, establishing a communications session between a first user and a second user in response to a customer support request by the second user, the second user being associated with a work queue that comprises a number of slots, wherein the number of slots is associated with a first limit specifying a maximum number of simultaneous customer support requests that can be handled by the first user, individual slots capable of being associated with a customer support request, determining that a number of customer support requests associated with the work queue has reached the maximum number of simultaneous customer support requests associated with the first user, wherein the maximum number is associated with the first limit of slots in the work queue, obtaining, during the communications session, communications session data, the communications session data including times and text of at least one message exchanged between the first user and the second user, processing the communications session data with the prediction model to determine a next message prediction, the next message prediction specifying a predicted start time and end time for receiving a next message from the second user and being associated with a confidence score for receiving the next message from the second user within the predicted start time and end time, determining, in response to the first limit being reached and based on the predicted start time and end time and the confidence score, that the work queue comprises slack capacity, wherein the slack capacity indicates additional availability for a type of customer support request when the first limit is reached, increasing the first limit of the number of slots in the work queue to a second limit based on the slack capacity, identifying an additional customer support request from a plurality of customer support requests that is associated with the type of customer support request, and determining whether to establish a second communications session between the first user and a third user during a time when the first limit is reached, based at least in part on the second limit, slack capacity, the type of customer support request, and the predicted start time and end time.

15. The computer-implemented method of claim 14, further comprising:

determining the predicted start time and end time satisfies a threshold prediction;

determining a timestamp associated with a most recent message from the second user; and establishing the second communications session between the first user and the third user within a predetermined time of the timestamp.

16. The computer-implemented method of claim 14, further comprising:

determining the predicted start time and end time satisfies a threshold prediction;

determining a timestamp associated with a most recent message from the first user; and establishing the second communications session between the first user and the third user within a predetermined time of the timestamp.

17. The computer-implemented method of claim 14, further comprising:

determining the period of time specified by the predicted start time and end time satisfies a threshold amount of time; and establishing the second communications session between the first user and the third user within a determined time of the predicted start time.

* * * * *